(12) United States Patent
Yun et al.

(10) Patent No.: US 8,009,256 B2
(45) Date of Patent: Aug. 30, 2011

(54) DISPLAY SUBSTRATE, METHOD OF MANUFACTURING THE SAME AND DISPLAY DEVICE HAVING THE SAME

(75) Inventors: Young-Nam Yun, Gunpo-si (KR); Soo-Guy Rho, Suwon-si (KR); Ji-Hye Moon, Seoul (KR); Myoung-Hi Lee, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 175 days.

(21) Appl. No.: 12/023,893

(22) Filed: Jan. 31, 2008

(65) Prior Publication Data
US 2008/0186434 A1 Aug. 7, 2008

(30) Foreign Application Priority Data

Feb. 2, 2007 (KR) .................. 10-2007-0010812

(51) Int. Cl.
*G02F 1/1343* (2006.01)
(52) U.S. Cl. ....................... 349/139; 349/143
(58) Field of Classification Search .................. None
See application file for complete search history.

(56) References Cited

U.S. PATENT DOCUMENTS

| | | | |
|---|---|---|---|
| 6,067,134 A * | 5/2000 | Akiyama et al. | 349/74 |
| 6,683,592 B1 * | 1/2004 | Murade | 345/87 |
| 2004/0229466 A1 * | 11/2004 | Ishikawa et al. | 438/689 |
| 2005/0117108 A1 * | 6/2005 | Kume et al. | 349/156 |
| 2007/0046879 A1 * | 3/2007 | Hirota et al. | 349/134 |
| 2008/0030657 A1 * | 2/2008 | Wu et al. | 349/106 |
| 2008/0106672 A1 * | 5/2008 | Kim et al. | 349/62 |

FOREIGN PATENT DOCUMENTS

| KR | 10-2005-0055608 | 6/2005 |
|---|---|---|
| KR | 10-2006-0031946 | 4/2006 |

OTHER PUBLICATIONS

English Abstract Publication No. 1020060031946.
English Abstract Publication No. 1020050055608.

* cited by examiner

*Primary Examiner* — Mike Stahl
(74) *Attorney, Agent, or Firm* — F. Chau & Associates, LLC

(57) ABSTRACT

A display substrate includes a base substrate, an organic ridge pattern, a pixel electrode and a shielding electrode. A plurality of pixel regions arranged in a matrix shape are formed on the base substrate. The organic ridge pattern is protruded between adjacent pixel regions. The pixel electrode is in each of the pixel regions. The shielding electrode is disposed on the organic ridge pattern, and is electrically connected to the pixel electrode.

16 Claims, 27 Drawing Sheets

DISPLAY SUBSTRATE, METHOD OF MANUFACTURING THE SAME AND DISPLAY DEVICE HAVING THE SAME

CROSS-REFERENCE TO RELATED APPLICATIONS

The present application claims priority under 35 U.S.C. §119 to Korean Patent Application No. 2007-10812, filed on Feb. 2, 2007, in the Korean Intellectual Property Office (KIPO), the contents of which are herein incorporated by reference in their entirety.

BACKGROUND OF THE INVENTION

1. Field of the Invention

The present invention relates to a display substrate, a method of manufacturing the display substrate and a display device having the display substrate. More particularly, the present invention relates to a display substrate capable of substantially preventing leakage of light, a method of manufacturing the display substrate and a display device having the display substrate having an improved image display quality.

2. Description of Related Art

A flat panel display device has various characteristics such as thin thickness, light weight, small size, etc., and is used in various fields.

A liquid crystal display (LCD) device is a kind of flat panel display device including an LCD panel having an array substrate, an opposite substrate opposite to the array substrate and a liquid crystal layer interposed between the array substrate and the opposite substrate. An arrangement of liquid crystals of the liquid crystal layer vary in response to an electric field applied to a pixel electrode of the array substrate and a common electrode of the opposite substrate, and a light transmittance of the liquid crystal layer is changed, thereby displaying an image.

When a pressure is applied to the LCD panel, the arrangement of the liquid crystals is disturbed so that light leaks through the disturbed liquid crystals. In addition, when the arrangement of the liquid crystals is disturbed, a response speed of the liquid crystals is decreased.

For example, when the LCD panel is integrally formed with a touch screen panel, the pressure is constantly applied to the LCD panel so that an image display quality of the LCD device is deteriorated.

SUMMARY OF THE INVENTION

A display substrate in accordance with one embodiment of the present invention includes a base substrate, an organic ridge pattern, a pixel electrode and a shielding electrode. A plurality of pixel regions is arranged in a matrix shape on the base substrate. The organic ridge pattern is protruded between adjacent pixel regions. A pixel electrode is disposed in each of the pixel regions. The shielding electrode is disposed on the organic ridge pattern, and is electrically connected to the pixel electrode.

A display substrate in accordance with another embodiment of the present invention includes a base substrate, a plurality of color filters, an organic ridge pattern and a common electrode. The color filters are arranged in a matrix shape on the base substrate. The organic ridge pattern is protruded between adjacent color filters. The common electrode is disposed on the base substrate to cover the color filters and the organic ridge pattern.

A method of manufacturing a display substrate in accordance with still another embodiment of the present invention is provided as follows. A thin film transistor, a plurality of gate lines and a plurality of data lines are formed on a base substrate. The thin film transistor is electrically connected to one of the gate lines and one of the data lines. An organic ridge pattern is formed between adjacent pixel regions formed on the base substrate. A transparent conductive layer is formed on the base substrate to cover the thin film transistor, the gate and data lines and the organic ridge pattern. The transparent conductive layer is patterned to form a pixel electrode in each of the pixel regions and a shielding electrode electrically connected to the pixel electrode on the organic ridge pattern.

A display device in accordance with still another embodiment of the present invention includes an array substrate, an opposite substrate and a liquid crystal layer. The array substrate includes a base substrate, an organic ridge pattern, a pixel electrode and a shielding electrode. The base substrate has a plurality of pixel regions arranged in a matrix shape. The organic ridge pattern is protruded between adjacent pixel regions. A pixel electrode is disposed in each of the pixel regions. The shielding electrode is disposed on the organic ridge pattern to be electrically connected to the pixel electrode. The opposite substrate faces the array substrate, and includes an opposite base substrate and a common electrode on the opposite base substrate. The liquid crystal layer is interposed between the array substrate and the opposite substrate.

A display device in accordance with still another embodiment of the present invention includes an array substrate, an opposite substrate and a liquid crystal layer. The array substrate includes a base substrate, a thin film transistor, an organic protecting layer and a pixel electrode. The base substrate has a plurality of pixel regions arranged in a matrix shape. The thin film transistor is in each of the pixel regions. The organic protecting layer is disposed on the base substrate to be electrically connected to the thin film transistor. The pixel electrode is electrically connected to the thin film transistor on the organic protecting layer. The opposite substrate faces the array substrate, and includes an opposite base substrate, a plurality of color filters, an organic ridge pattern and a common electrode. The color filters are arranged in a matrix shape on the opposite base substrate. The organic ridge pattern is protruded between adjacent color filters. The common electrode is disposed on the opposite base substrate to cover the color filters and the organic ridge pattern. The liquid crystal layer is interposed between the array substrate and the opposite substrate.

The display substrate includes an array substrate, a color filter substrate, a color filter on array (COA) substrate, etc.

BRIEF DESCRIPTION OF THE DRAWINGS

The present invention will become more apparent by describing in detail example embodiments thereof with reference to the accompanying drawings, in which.

DETAILED DESCRIPTION OF EXEMPLARY EMBODIMENTS

Figure 1:
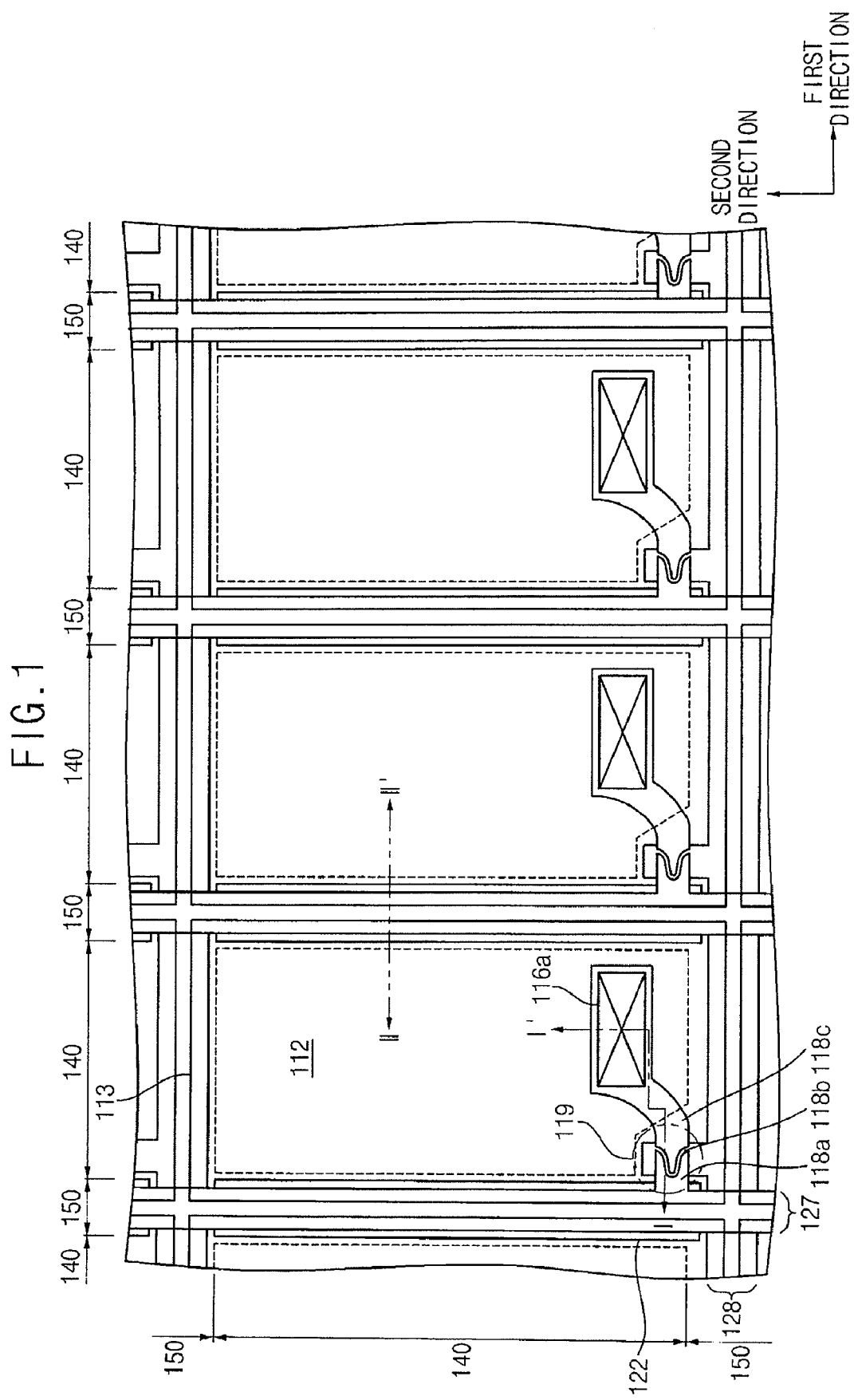
FIG. 1 is a plan view illustrating an array substrate in accordance with an exemplary embodiment of the present invention.

The present invention is described more fully hereinafter with reference to the accompanying drawings, in which exemplary embodiments of the invention are shown. This invention may, however, be embodied in many different forms and should not be construed as limited to embodiments set forth herein. Rather, embodiments are provided so that this disclosure will be thorough and complete, and will fully convey the scope of the invention to those skilled in the art. In the drawings, the size and relative sizes of layers and regions may be exaggerated for clarity.

Like numbers refer to like elements throughout. As used herein, the term "and/or" includes any and all combinations of one or more of the associated listed items.

Hereinafter, the present invention will be described in detail with reference to the accompanying drawings.

Figure 2:
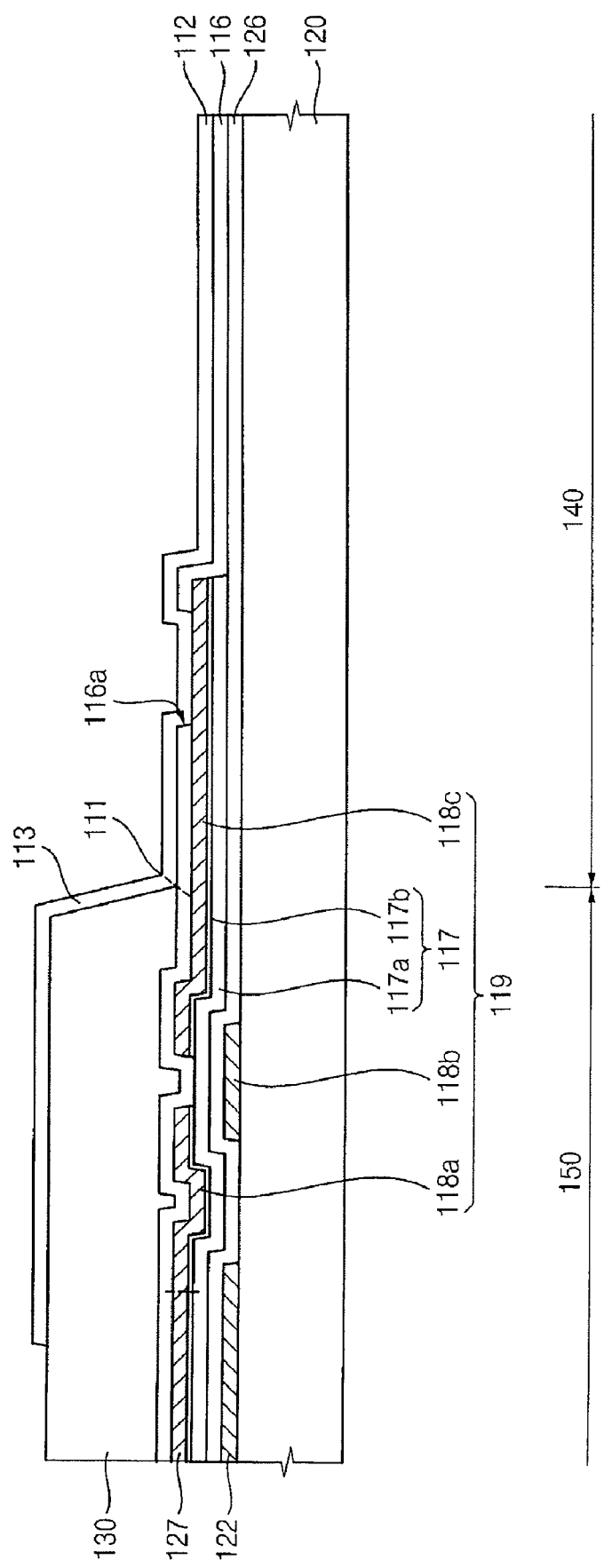
FIG. 2 is a cross-sectional view taken along a line I-I' shown in FIG. 1.
Figure 3:
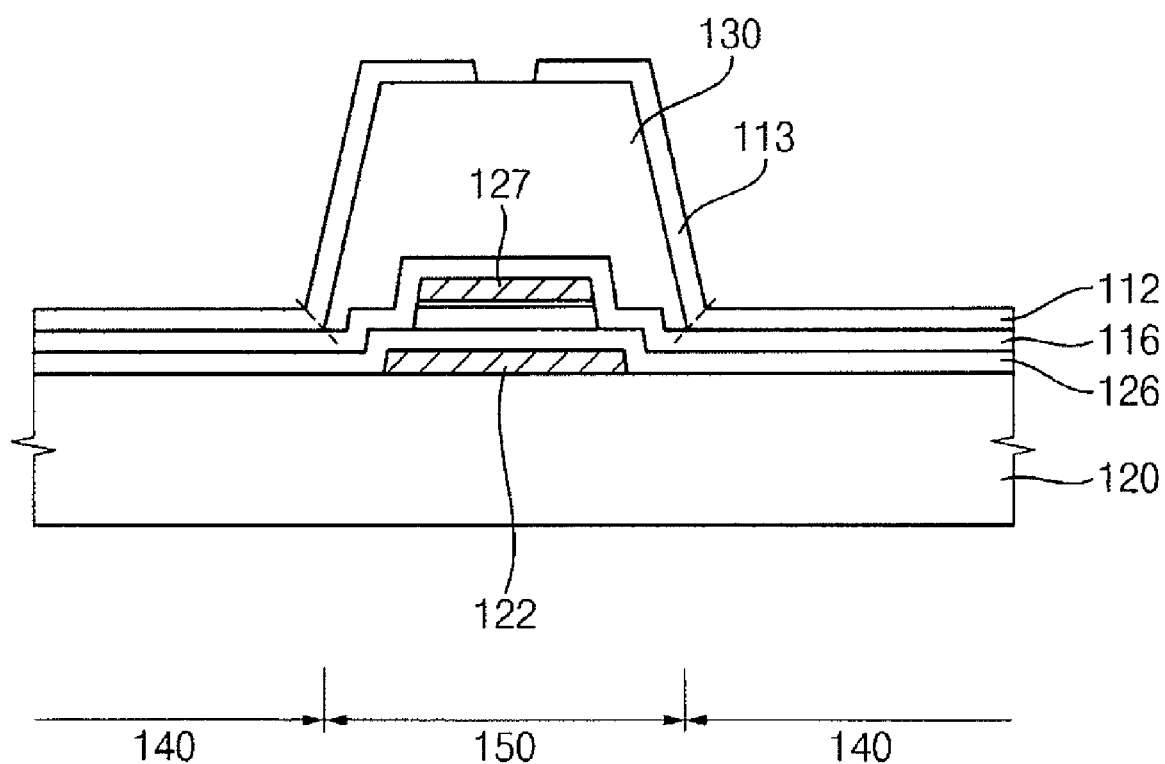
FIG. 3 is a cross-sectional view taken along a line II-II' shown in FIG. 1.

FIG. 1 is a plan view illustrating an array substrate in accordance with an exemplary embodiment of the present invention. FIG. 2 is a cross-sectional view taken along a line I-I' shown in FIG. 1. FIG. 3 is a cross-sectional view taken along a line II-II' shown in FIG. 1.

Referring to FIGS. 1 to 3, the array substrate includes a lower base substrate 120, a light blocking pattern 122, a gate line 128, a data line 127, a thin film transistor 119, a semiconductor pattern 117, a gate insulating layer 126, a passivation layer 116, an organic ridge pattern 130, a pixel electrode 112 and a shielding electrode 113. Alternatively, the array substrate may include a plurality of gate lines 128, a plurality of data lines 127, a plurality of thin film transistors 119, a plurality of organic ridge patterns 130, a plurality of pixel electrodes 112 and a plurality of shielding electrodes 113.

The lower base substrate 120 includes a plurality of pixel regions 140 arranged in a matrix shape and a signal transmission region 150 interposed between the pixel regions 140.

The lower base substrate 120 includes a glass substrate that transmits light. In FIGS. 1 to 3, the glass substrate does not include alkali ions, thereby improving electric characteristics of the thin film transistors 119. Alternatively, the lower base substrate 120 may include a transparent synthetic resin. Examples of the transparent synthetic resin that can be used for the lower base substrate 120 include triacetylcellulose (TAC), polycarbonate (PC), polyethersulfone (PES), polyethylene terephthalate (PET), polyethylene naphthalate (PEN), polyvinyl alcohol (PVA), polymethyl methacrylate (PMMA), cyclo-olefin polymer (COP), etc.

The gate lines 128 are extended in a first direction on the base substrate 120, and are substantially parallel with each other. The first direction may be a longitudinal direction of the base substrate 120.

The light blocking patterns 122 are substantially aligned in a second direction between adjacent gate lines 128 on the lower base substrate 120, and are electrically insulated from the gate lines 128. The second direction may be a horizontal direction of the base substrate 120. The light blocking patterns 122 block incident light from passing through a space between adjacent shielding electrodes 113 to increase a contrast ratio of the display device.

The array substrate may further include a plurality of storage capacitor lines (not shown) interposed between the adjacent gate lines 128 on the lower base substrate 120, and the storage capacitor lines may be overlapped with the pixel electrodes 112 to form the storage capacitors (not shown).

The gate insulating layer 126 is disposed on the lower base substrate 120 to cover the gate lines 128 and a gate electrode 118b of each of the thin film transistors 119. The gate electrode 118b is electrically connected to each of the gate lines 128.

The semiconductor pattern 117 is disposed on the gate insulating layer 126, and includes an amorphous silicon pattern 117a and an N+ amorphous silicon pattern 117b on the amorphous silicon pattern 117a. In FIGS. 1 to 3, the amorphous silicon pattern 117a is disposed under the data lines 127, a source electrode 118a of the thin film transistor 119 and a drain electrode 118c of the thin film transistor 119, and a space between the source and drain electrodes 118a and 118c. In addition, the N+ amorphous silicon pattern 117b is disposed under the data lines 127, the source electrode 118a and the drain electrode 118c.

The source electrode 118a is disposed on a portion of the semiconductor pattern 117 corresponding to the gate electrode 118b. The drain electrode 118c is spaced apart from the source electrode 118a, and is disposed on a portion of the semiconductor pattern 117 corresponding to the gate electrode 118b.

The data lines 127 are extended in the second direction on the semiconductor pattern 117, and are aligned substantially in parallel with each other.

The passivation layer 116 is disposed on the gate insulating layer 126, and covers the data lines 127 and the thin film transistor 119. For example, the passivation layer 116 has a contact hole 116a through which the drain electrode 118c is partially exposed.

The organic ridge pattern 130 is extended along the gate and data lines 128 and 127, and is in the signal transmission region 150. For example, the organic ridge pattern 130 is disposed on the passivation layer 116.

The organic ridge pattern 130 has a ridge shape extended in the first direction or the second direction. A cross-section of the organic ridge pattern 130 may have a polygonal shape, a semi-circular shape, a semi-elliptical shape, etc. In FIGS. 1 to 3, the organic ridge pattern 130 has a trapezoidal cross-section.

Figure 4:
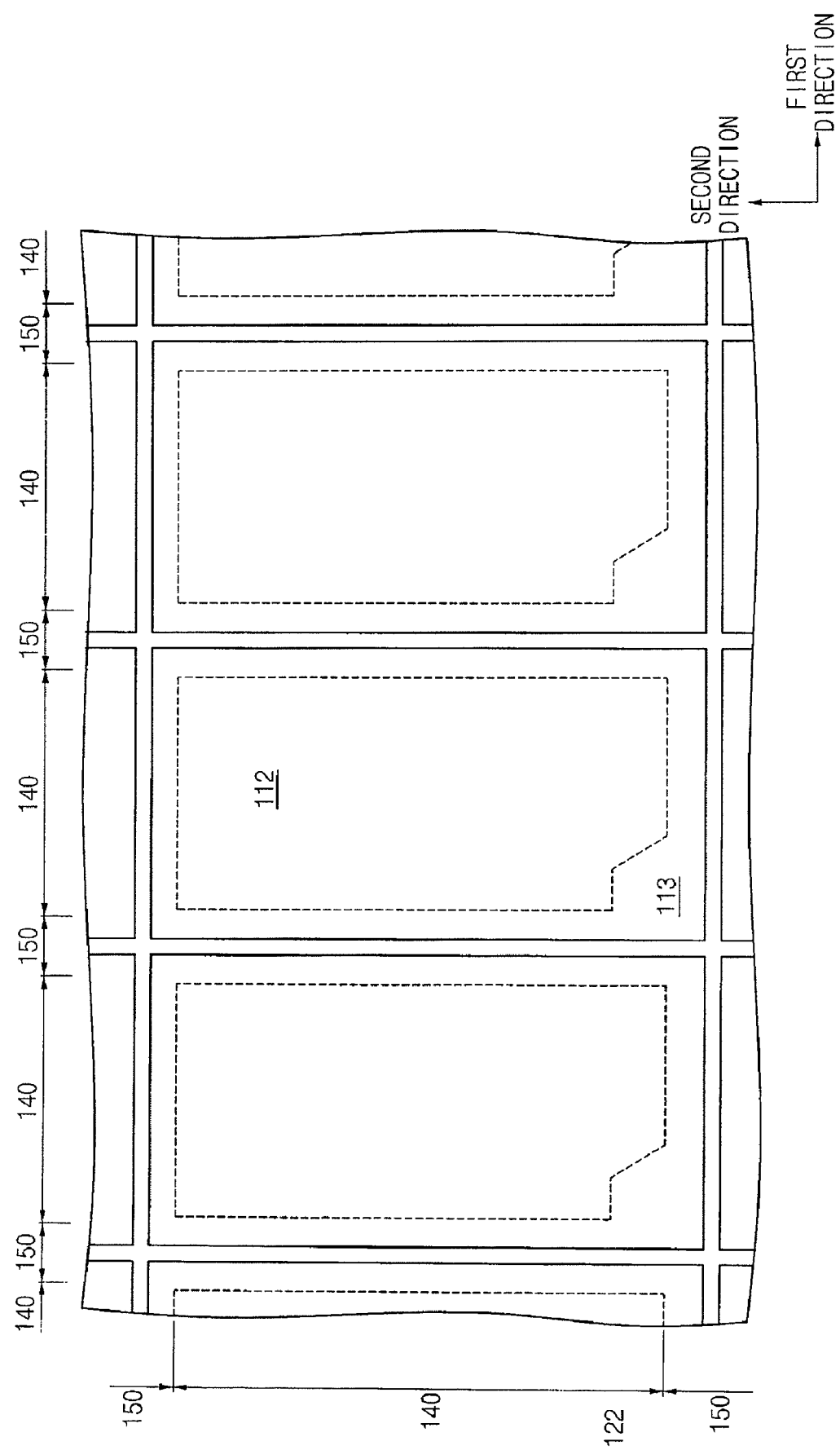
FIG. 4 is a plan view illustrating a pixel electrode and a shielding electrode of FIG. 1.

FIG. 4 is a plan view illustrating a pixel electrode and a shielding electrode of FIG. 1.

Referring to FIGS. 1 to 4, the pixel electrode 112 is disposed in the pixel region 140, and is electrically connected to the drain electrode 118c through the contact hole 116a.

The shielding electrode 113 is disposed on the organic ridge pattern 130, and is electrically connected to the pixel electrode 112. In FIGS. 1 to 4, the shielding electrode 113 surrounds the pixel electrode 112, and a boundary 111 between the shielding electrode 113 and the pixel electrode 112 is overlapped with a boundary between the signal transmission region 150 and the pixel region 140.

The shielding electrode 113 is partially overlapped with the gate line 128 and the data line 127. A distance between the shielding electrode 113 and the gate line 128 is increased by the organic ridge pattern 130 that is disposed on the gate line 128 so that a parasitic capacitance between the shielding electrode 113 and the gate line 128 is decreased. Also, a distance between the shielding electrode 113 and the data line 127 is increased by the organic ridge pattern 130 on the data line 127, so that a parasitic capacitance between the shielding electrode 113 and the data line 127 is decreased.

The shielding electrode 113 is protruded with respect to the pixel electrode 112 to generate a strong electric field between the shielding electrode 113 and the common electrode of the opposite substrate. Thus, liquid crystals between adjacent pixel electrodes 112 are not disturbed.

In FIGS. 1 to 4, the shielding electrode 113 covers the thin film transistor 119. The pixel electrode 112 may cover the thin film transistor 119, and the pixel electrode 112 and the pixel region 140 may have a substantially rectangular shape.

According to the array substrate of FIGS. 1 to 4, the shielding electrode 113 is formed on the organic ridge pattern 130 so that the shielding electrode 113 is protruded with respect to the pixel electrode 112. Therefore, the distance between the shielding electrode 113 and the common electrode is decreased so that an intensity of the electric field formed between the shielding electrode 113 and the common electrode is increased, thereby substantially preventing the distortion of the liquid crystals interposed between the adjacent pixel electrodes 112.

FIGS. 5 to 9 are cross-sectional views illustrating a method of manufacturing the array substrate shown in FIG. 1.

Figure 5:
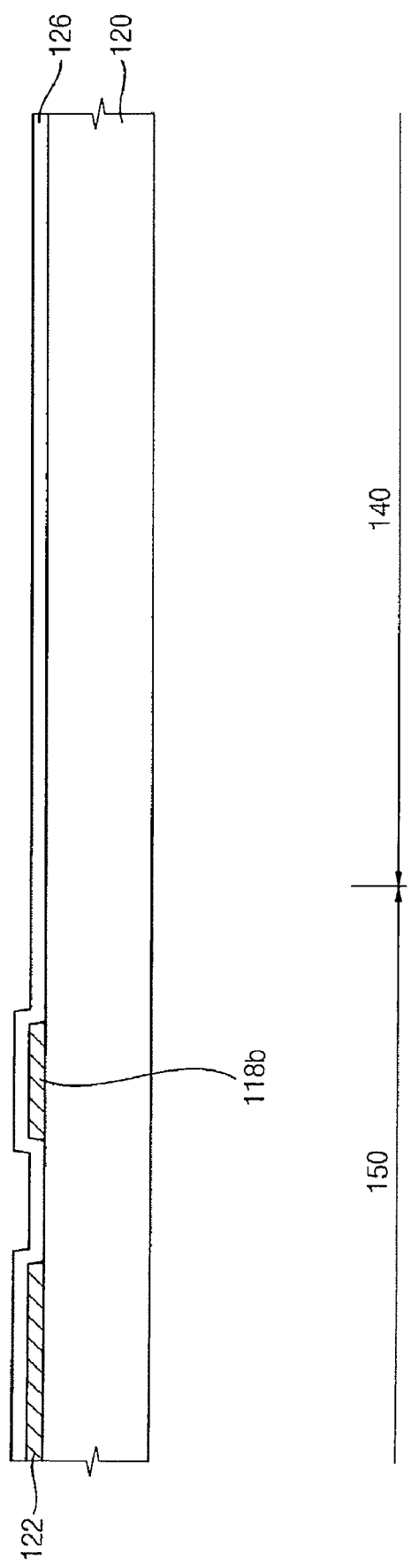
FIGS. 5 to 9 are cross-sectional views illustrating a method of manufacturing the array substrate shown in FIG. 1.

Referring to FIGS. 1 and 5, a gate metal layer (not shown) is deposited on the lower base substrate 120. The gate metal layer is patterned to form the gate electrode 118b, the gate line 128 and the light blocking pattern 122.

Figure 6:
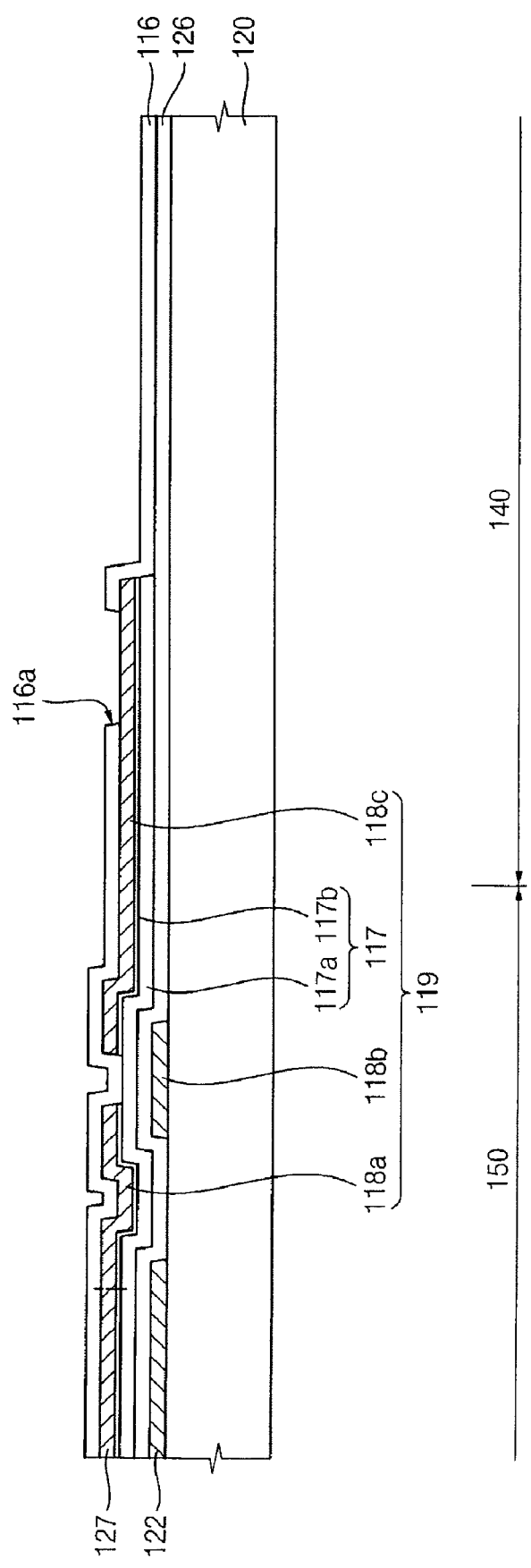

The gate insulating layer 126 is formed on the lower base substrate 120 to cover the gate electrode 118b, the gate line 128 and the light blocking pattern 122. Referring to FIGS. 1 and 6, a semiconductor layer (not shown) including an amorphous silicon layer (not shown) and an N+ amorphous silicon layer (not shown) is formed on the gate insulating layer 126. In FIGS. 1 and 6, to form the semiconductor layer, a primary amorphous silicon layer (not shown) is deposited on the gate insulating layer 126, and N+ ions are implanted into an upper portion of the primary amorphous silicon layer to form the amorphous silicon layer and the N+ amorphous silicon layer.

A data metal layer (not shown) is deposited on the semiconductor layer. The data metal layer is patterned to form the data line 127, the source electrode 118a and the drain electrode 118c. The amorphous silicon layer and the N+ amorphous silicon layer are partially etched using the data line 127, the source electrode 118a and the drain electrode 118c as an etching mask to form the semiconductor pattern 117 including the amorphous silicon pattern 117a and the N+ amorphous silicon pattern 117b. In FIGS. 1 and 6, the data metal layer and the semiconductor layer are patterned through a photolithography process using a half-tone mask.

The passivation layer 116 is deposited on the gate insulating layer 126 to cover the data line 127, the source electrode 118a and the drain electrode 118c.

The passivation layer 116 is partially etched to form a contact hole 116a through which the drain electrode 118c is partially exposed.

Figure 7:
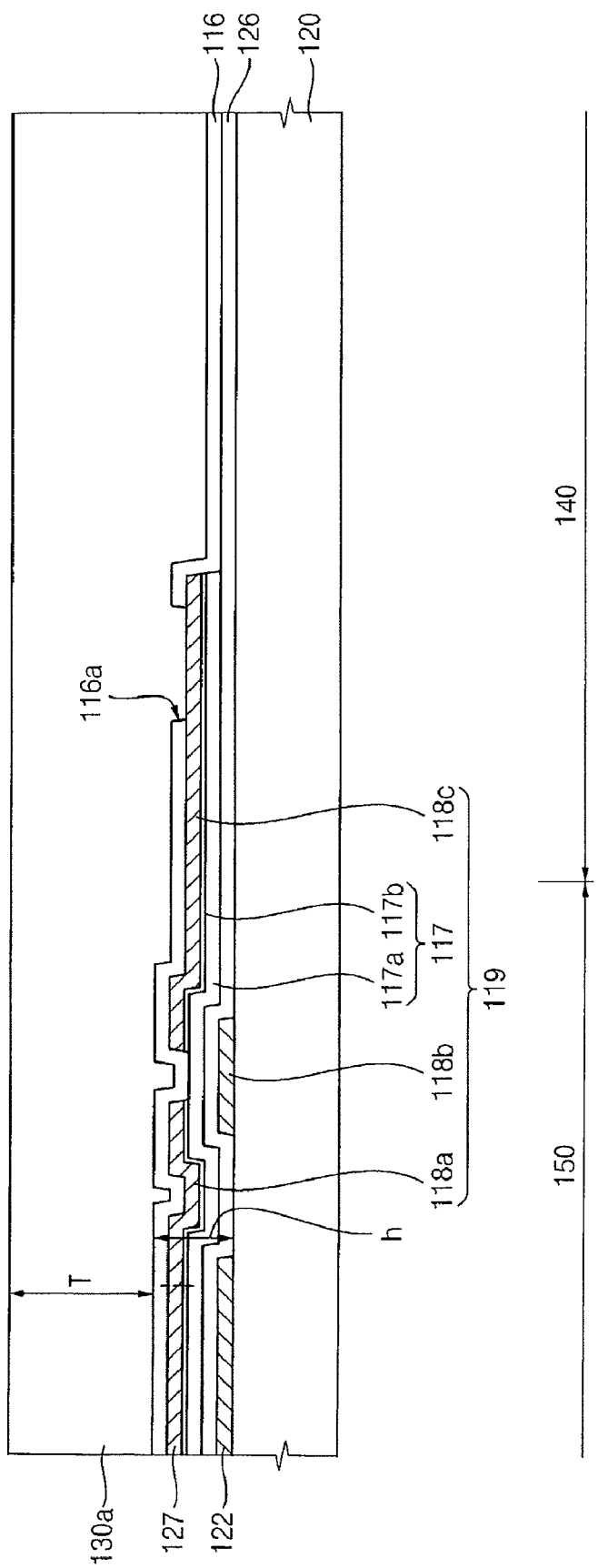

Referring to FIG. 7, a photoresist film 130a is formed on the passivation layer 116. The photoresist film 130a planarizes a surface of the lower substrate 120 including the gate line 128, the data line 127 and the thin film transistor 119. In FIG. 7, a thickness T of the photoresist film 130a is no less than a height h of the passivation layer 116, and is no more than about a half of a thickness of a liquid crystal layer (not shown).

Figure 8:
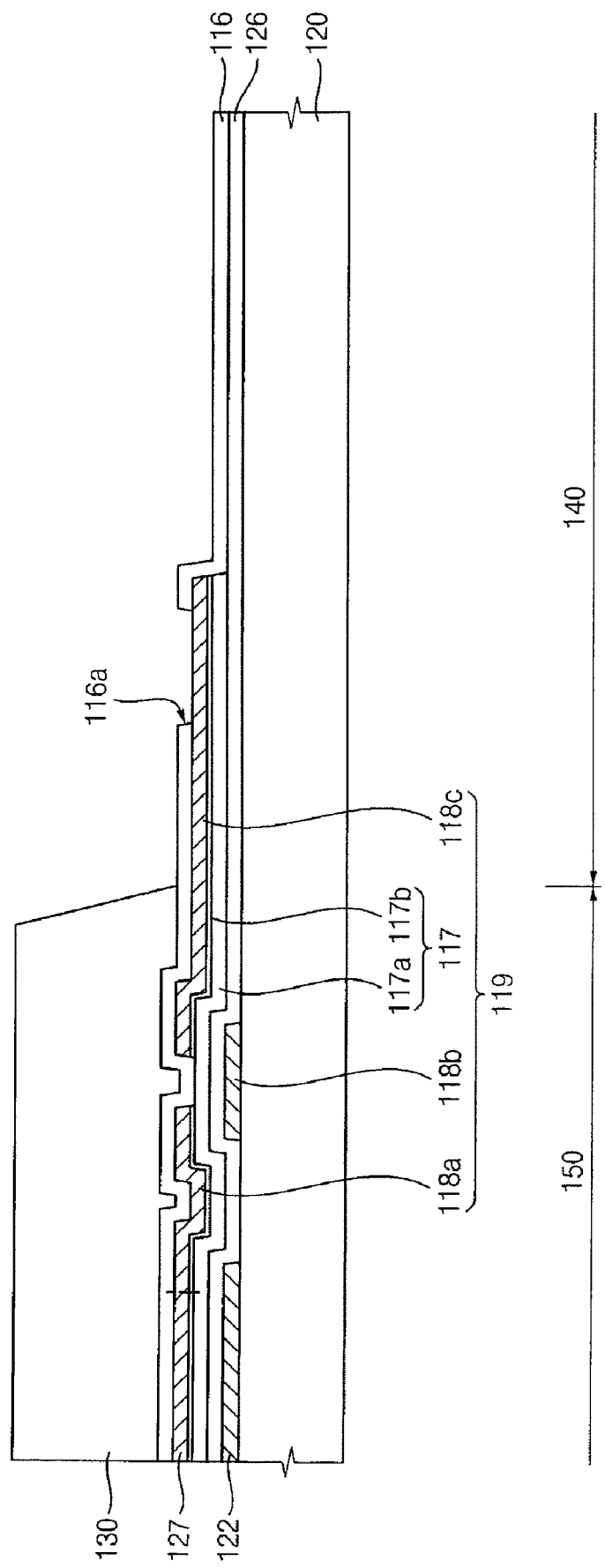

Referring to FIG. 8, the photoresist film 130a disposed in the pixel region 140 is removed. In FIG. 8, the photoresist film 130a disposed in the pixel region 140 is removed so that the organic ridge pattern 130 is formed in the signal transmission region 150, and the passivation layer 160 in the pixel region 140 and the contact hole 116a are exposed. Alternatively, the photoresist film 130a in the pixel region 140 may be partially removed so that the photoresist film 130a may remain in the pixel region 140 at a constant thickness. When the photoresist film 130a remains in the pixel region 140, the contact hole 116a may be formed after the organic ridge pattern 130 is formed.

Figure 9:
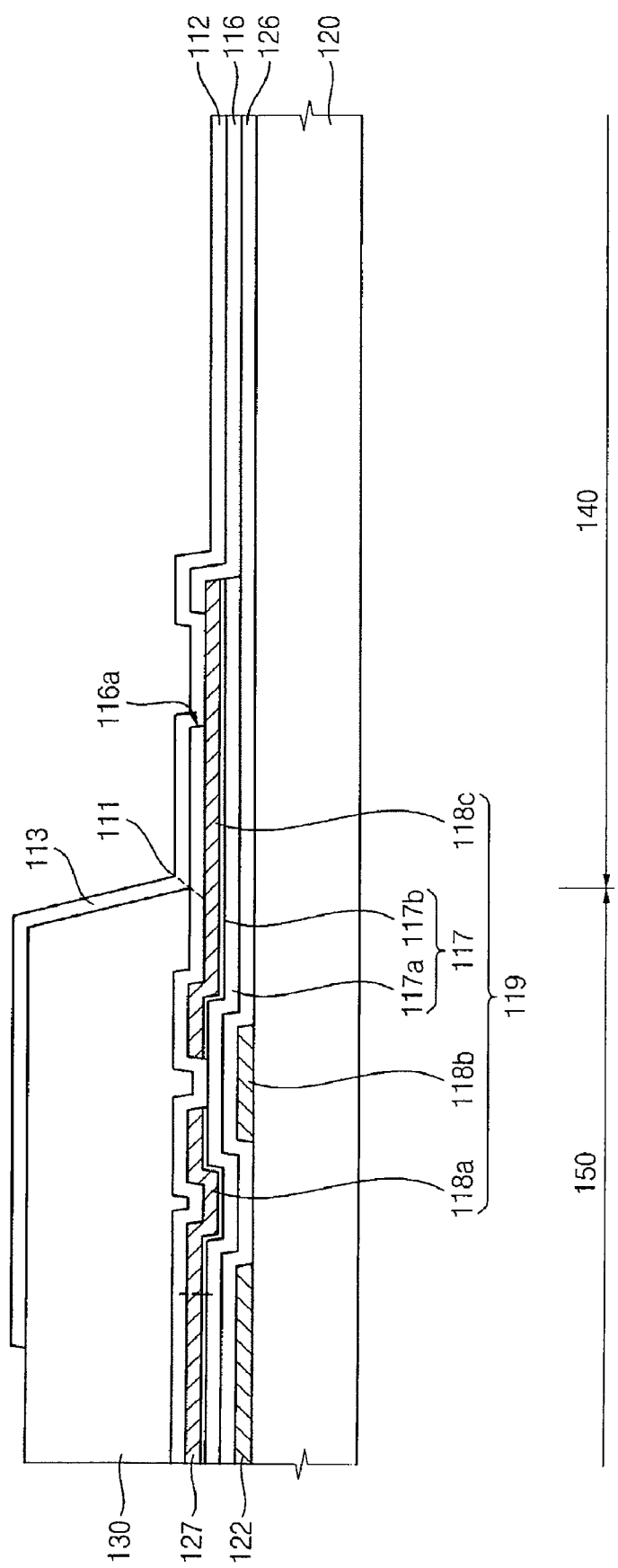

Referring to FIG. 9, a transparent conductive layer (not shown) is formed on the passivation layer 116 on which the organic ridge pattern 130 is formed. The transparent conductive layer is partially etched to form the pixel electrode 112 and the shielding electrode 113. The pixel electrode 112 is electrically connected to the drain electrode 118c through the contact hole 116a.

According to an exemplary method of manufacturing the display substrate shown in FIGS. 1 to 9, the array substrate includes the shielding electrode 113 so that an aperture ratio of the display device is increased.

In addition, the shielding electrode 113 is formed on the organic ridge pattern 130 so that the intensity of the electric field formed between the shielding electrode 113 and the common electrode is increased. Thus, a response speed of the liquid crystals adjacent to the sides of the pixel electrode 112 is increased, and the distortion of the liquid crystals interposed between the adjacent pixel electrodes 112 is substantially prevented.

Furthermore, the liquid crystals on the side surface of the organic ridge pattern 130 are substantially aligned toward the pixel region 112 so that the restoring force of the liquid crystals is increased.

Figure 10:
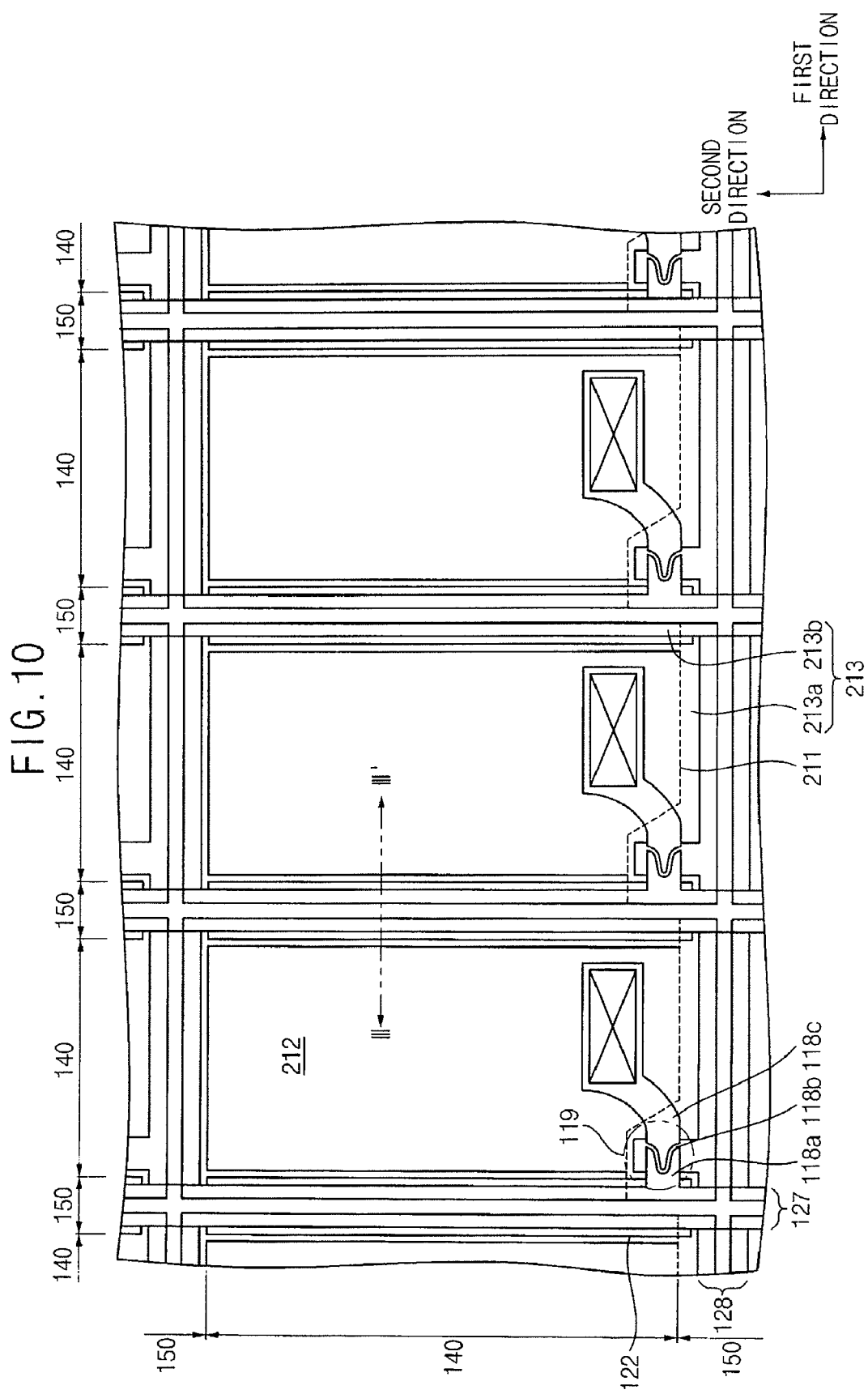
FIG. 10 is a plan view illustrating an array substrate in accordance with an exemplary embodiment of the present invention.
Figure 11:
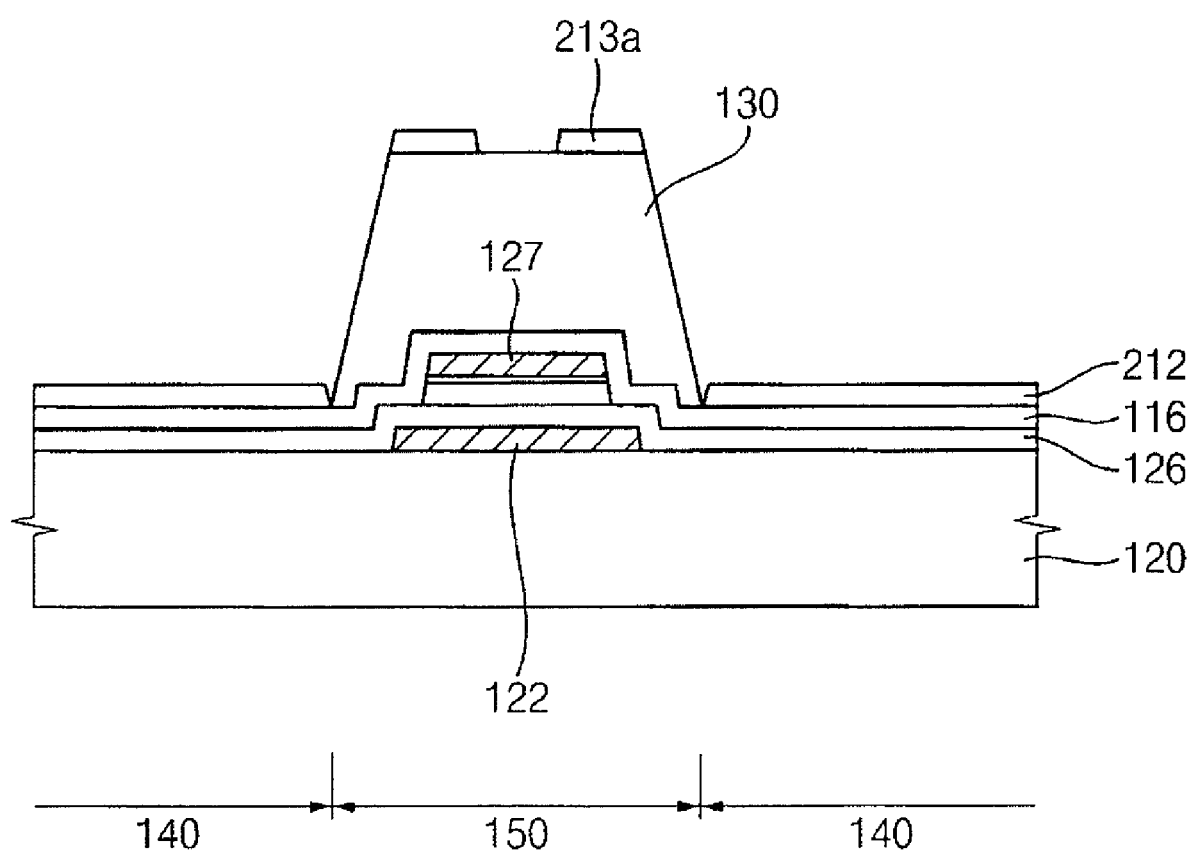
FIG. 11 is a cross-sectional view taken along a line III-III' shown in FIG. 10.
Figure 12:
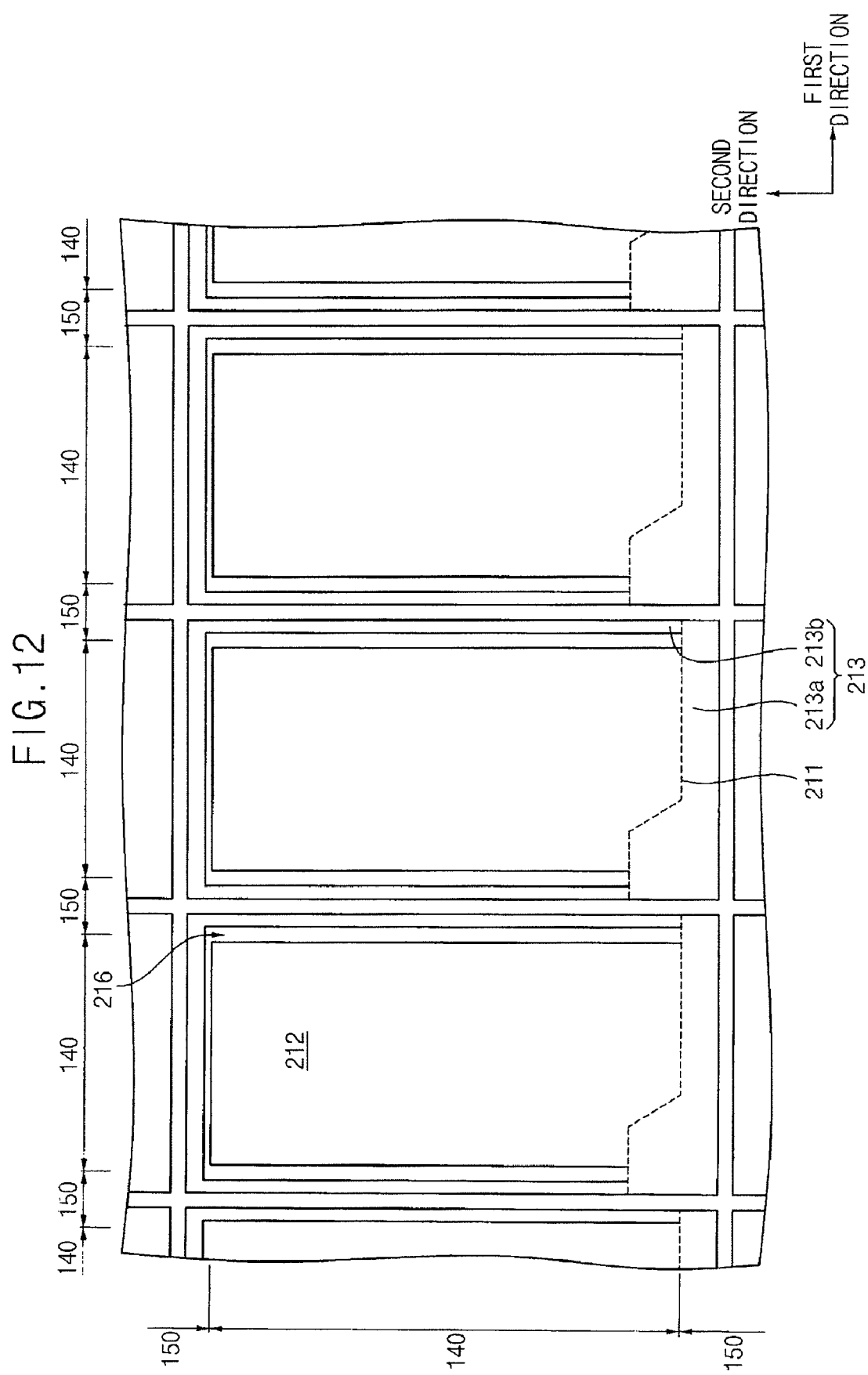
FIG. 12 is a plan view illustrating a pixel electrode and a shielding electrode shown in FIG. 10.

FIG. 10 is a plan view illustrating an array substrate in accordance with an exemplary embodiment of the present invention. FIG. 11 is a cross-sectional view taken along a line III-III' shown in FIG. 10. FIG. 12 is a plan view illustrating a pixel electrode and a shielding electrode shown in FIG. 10. The array substrate of FIGS. 10 to 12 is substantially the same as in FIGS. 1 to 4 except for a shielding electrode. Thus, the same reference numerals will be used to refer to the same or like parts as those described in FIGS. 1 to 4 and any further explanation concerning the above elements will be omitted.

Referring to FIGS. 10 to 12, the shielding electrode 213 includes a shielding portion 213a and a connecting portion 213b, and surrounds the pixel electrode 212. The shielding portion 213a is spaced apart from the pixel electrode 212 to form an opening 216. The shielding portion 213a is disposed on the organic ridge pattern 130, and a side surface of the organic ridge pattern 130 is exposed through the opening 216. When the side surface of the organic ridge pattern 130 is covered by the shielding electrode, an electric field may be formed along the side surface of the organic ridge pattern 130 so that liquid crystals on the side surface of the organic ridge pattern 130 may be distorted. However, in FIGS. 10 to 12, the side surface of the organic ridge pattern 130 is exposed, so that the liquid crystals are substantially aligned along the electric field formed between the shielding portion 213a and the pixel electrode 112.

The connecting portion 213b is formed on the side surface of the organic ridge pattern 130 to electrically connect the pixel electrode 212 to the shielding portion 213a. In FIGS. 10 to 12, the connecting portion 213b may be formed under the organic ridge pattern 130.

According to the array substrate of FIGS. 10 to 12, uniformity of liquid crystal arrangement on the side surface of the organic ridge pattern 130 is improved so that leakage of light is decreased.

Figure 13:
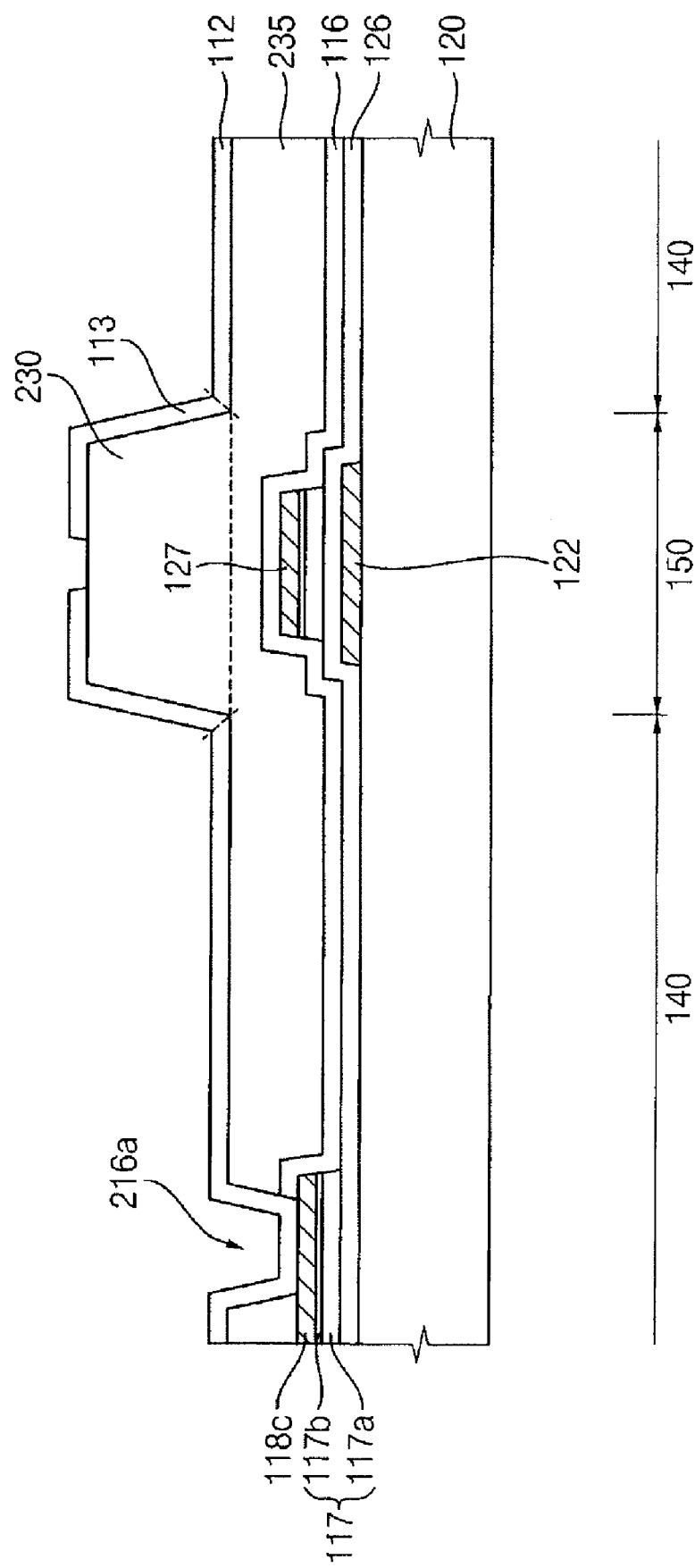
FIG. 13 is a cross-sectional view illustrating an array substrate in accordance with an exemplary embodiment of the present invention.

FIG. 13 is a cross-sectional view illustrating an array substrate in accordance with an exemplary embodiment of the present invention. The array substrate of FIG. 13 is substantially the same as in FIGS. 1 to 4 except for a shielding electrode. Thus, the same reference numerals will be used to refer to the same or like parts as those described in FIGS. 1 to 4 and any further explanation concerning the above elements will be omitted.

Referring to FIGS. 1 and 13, an organic protecting layer 235 is formed on the passivation layer 116. The organic protecting layer 235 planarizes a surface of the lower base substrate 120 on which a data line 127, a gate line 128 and a thin film transistor 119 are formed. The organic protecting layer 235 and the passivation layer 116 have a contact hole 216a through which a drain electrode of the thin film transistor 119 is partially exposed.

The organic ridge pattern 230 is disposed on the organic protecting layer 235.

The pixel electrode 112 is disposed on the organic protecting layer 235, and is electrically connected to the drain electrode 118c through the contact hole 216a.

The shielding electrode 113 is disposed on the organic ridge pattern 230, and is electrically connected to the pixel electrode 112.

In FIG. 13, the organic protecting layer 235 and the organic ridge pattern 230 are formed using a single mask. For example, an exposure amount is adjusted to change a thickness of the organic protecting layer 235. The contact hole 216a is formed after the organic protecting layer 235 is formed.

Figure 14:
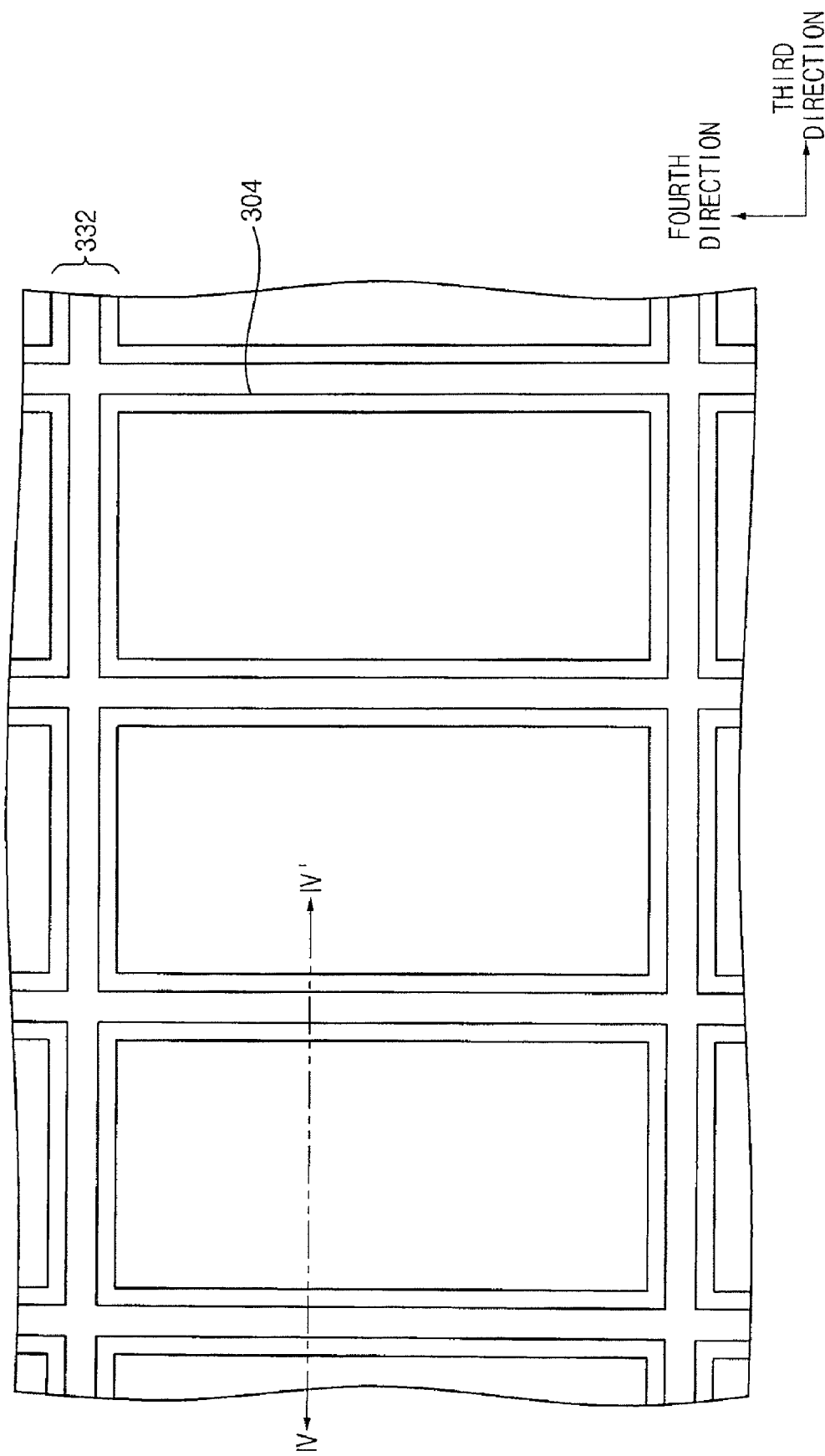
FIG. 14 is a plan view illustrating an opposite substrate in accordance with an exemplary embodiment of the present invention.
Figure 15:
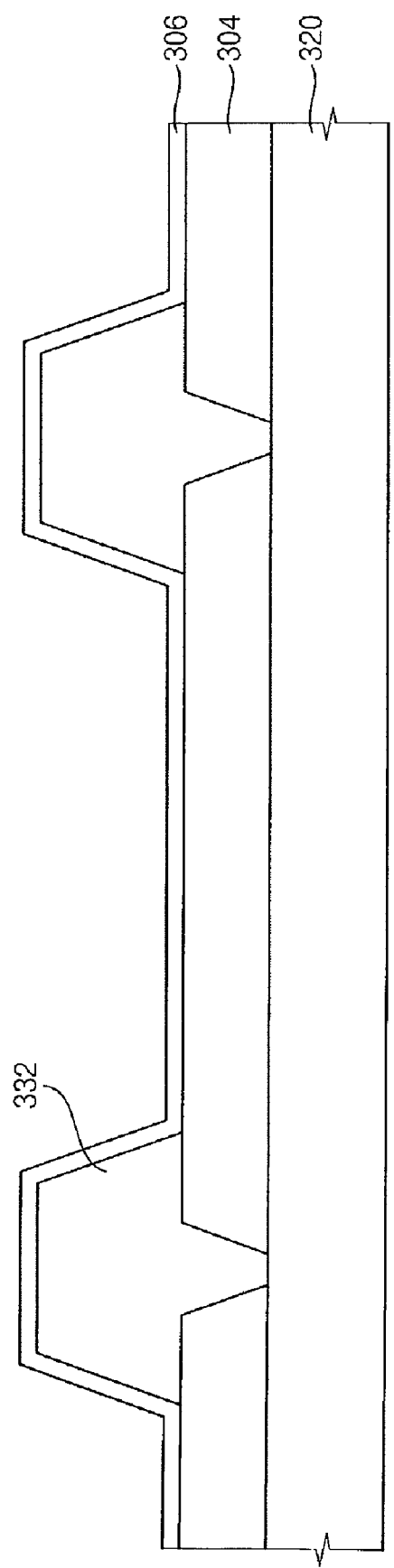
FIG. 15 is a cross-sectional view taken along a line IV-IV' shown in FIG. 14.

FIG. 14 is a plan view illustrating an opposite substrate in accordance with an exemplary embodiment of the present invention. FIG. 15 is a cross-sectional view taken along a line IV-IV' shown in FIG. 14.

Referring to FIGS. 14 and 15, the opposite substrate includes an upper base substrate 320, a color filter 304, an opposite organic ridge pattern 332 and a common electrode 306. Alternatively, the opposite substrate may further include a plurality of color filters 304 and a plurality of opposite organic ridge patterns 332.

In FIGS. 14 and 15, the upper base substrate 320 includes substantially the same material as the lower base substrate shown in FIG. 1. Thus, any further explanation concerning the above element will be omitted.

The color filters 304 are arranged on the upper base substrate 320 in a matrix shape. For example, the color filters 304 include a red color filter, a green color filter and a blue color filter.

A black matrix (not shown) may be interposed between adjacent color filters 304 on the upper base substrate 320.

The opposite organic ridge patterns 332 are protruded between adjacent color filters 304. In FIGS. 14 and 15, the opposite organic ridge patterns 332 face gate and data lines of an array substrate.

The common electrode 306 is disposed on the color filters 304 to cover the opposite organic ridge patterns 332.

According to the opposite substrate of FIGS. 14 and 15, the opposite substrate includes the opposite organic ridge patterns 332 so that a distance between the common electrode 306 that is between the adjacent color filters 304 and a pixel electrode (or a shielding electrode) of an array substrate is decreased. Thus, an intensity of an electric field between the adjacent color filters 304 is increased so that uniformity of liquid crystal arrangement between the adjacent color filters 304 is improved.

Figure 16:
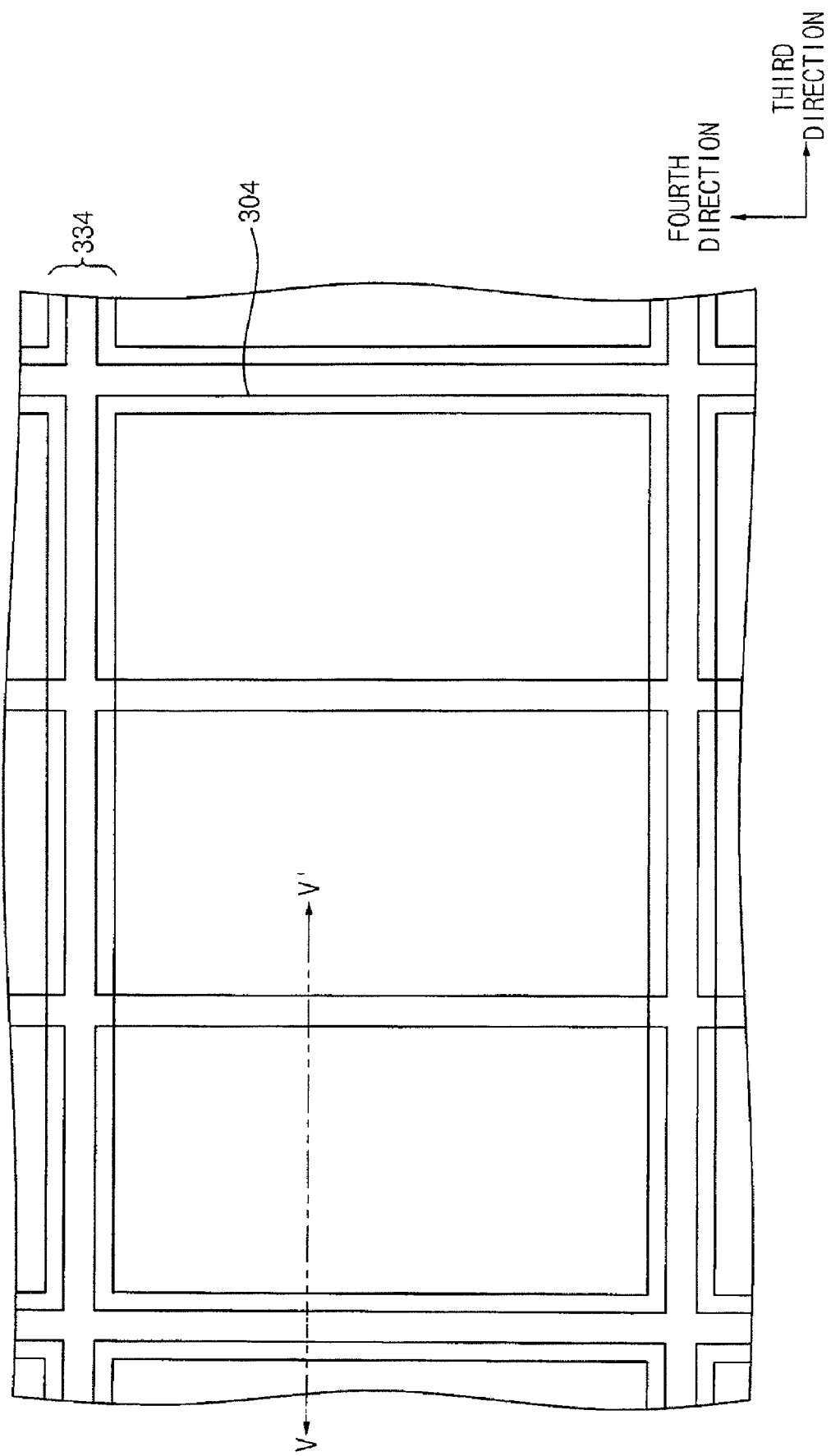
FIG. 16 is a plan view illustrating an opposite substrate in accordance with a an exemplary embodiment of the present invention.
Figure 17:
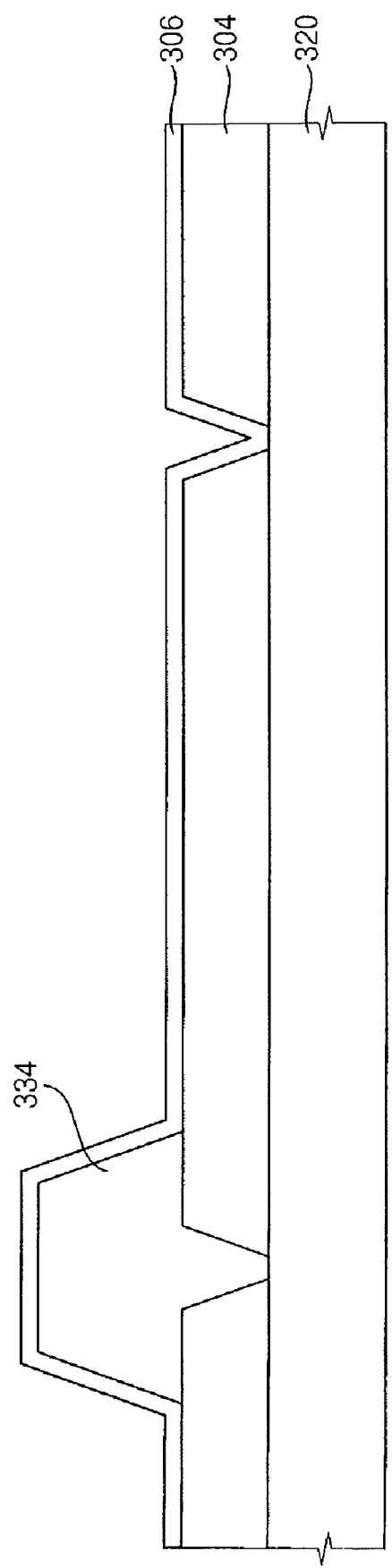
FIG. 17 is a cross-sectional view taken along a line V-V' shown in FIG. 16.

FIG. 16 is a plan view illustrating an opposite substrate in accordance with an exemplary embodiment of the present invention. FIG. 17 is a cross-sectional view taken along a line V-V' shown in FIG. 16. The opposite substrate of FIGS. 16 and 17 is substantially the same as in FIGS. 14 and 15 except for an opposite organic ridge pattern. Thus, the same reference numerals will be used to refer to the same or like parts as those described in FIGS. 14 and 15 and any further explanation concerning the above elements will be omitted.

Referring to FIGS. 16 and 17, the opposite organic ridge pattern 334 surrounds three color filters 304. For example, the substrate is combined with an array substrate to interpose a liquid crystal layer of a twisted neumatic mode.

In FIGS. 16 and 17, the opposite organic ridge pattern 334 surrounds three color filters 304 aligned in the third direction. The opposite organic ridge pattern 334 may correspond to a pressure sensing electrode of an array substrate having a touch sensing circuit (not shown). Alternatively, the opposite organic ridge pattern 334 may correspond to a photo sensing electrode of an array substrate having a photo sensing circuit (not shown). The opposite organic ridge pattern may surround two color filters or no less than four color filters. Alternatively, the opposite organic ridge pattern 334 may surround three color filters aligned in a fourth direction that is substantially perpendicular to the third direction.

The common electrode 306 is disposed on the opposite organic ridge pattern 334 and the color filters 304 covered by the opposite organic ridge pattern 334.

According to the opposite substrate of FIGS. 16 and 17, the opposite organic ridge pattern 334 has various shapes based on a mode of the liquid crystal layer so that an image display quality of a display device is improved.

Figure 18:
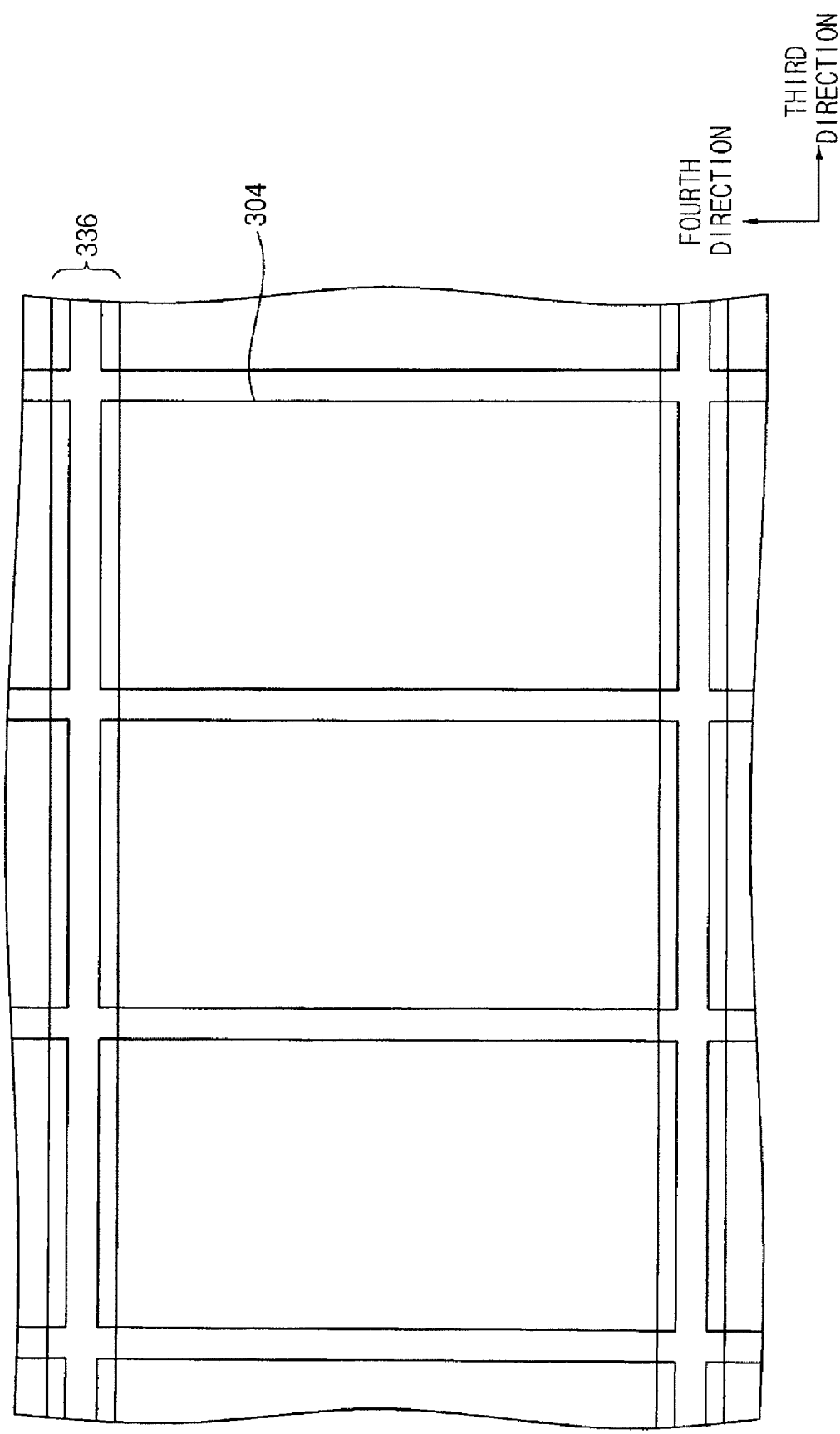
FIG. 18 is a plan view illustrating an opposite substrate in accordance with an exemplary embodiment of the present invention.

FIG. 18 is a plan view illustrating an opposite substrate in accordance with an exemplary embodiment of the present invention. The opposite substrate of FIG. 18 is substantially the same as in FIGS. 14 and 15 except for an opposite organic ridge pattern. Thus, the same reference numerals will be used to refer to the same or like parts as those described in FIGS. 14 and 15 and any further explanation concerning the above elements will be omitted.

Referring to FIG. 18, the opposite organic ridge pattern 336 is extended only in the third direction. In FIG. 18, the opposite organic ridge pattern 336 is not extended in the fourth direction.

A common electrode 306 (shown in FIG. 15) is protruded in the third direction along the opposite organic ridge pattern 336 that is extended in the third direction.

According to the opposite substrate of FIG. 18, the opposite organic ridge pattern 336 that is protruded in the third direction substantially prevents leakage of light in the third direction.

Figure 19:
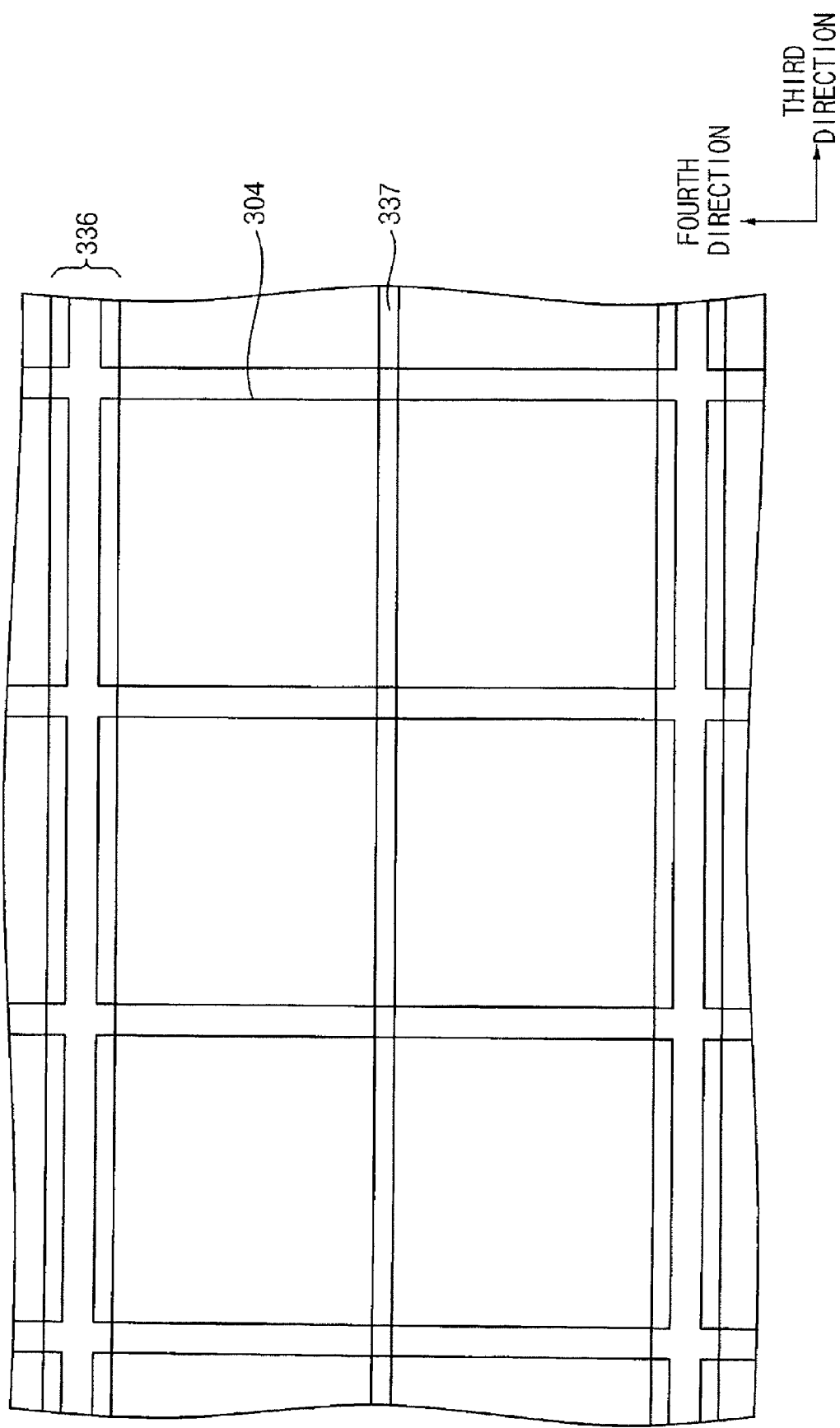
FIG. 19 is a plan view illustrating an opposite substrate in accordance with an exemplary embodiment of the present invention.

FIG. 19 is a plan view illustrating an opposite substrate in accordance with an exemplary embodiment of the present invention. The opposite substrate of FIG. 19 is substantially the same as in FIG. 18 except for an opposite organic ridge pattern. Thus, the same reference numerals will be used to refer to the same or like parts as those described in FIG. 18 and any further explanation concerning the above elements will be omitted.

Referring to FIG. 19, the opposite substrate may further include an auxiliary organic ridge pattern 337. The auxiliary organic ridge pattern 337 is formed from substantially the same layer as an opposite organic ridge pattern 336, and crosses a plurality of color filters 304 in the third direction.

According to the opposite substrate of FIG. 19, the auxiliary organic ridge pattern 337 crosses the color filters 304 in the third direction to increase a response speed of liquid crystals adjacent to the auxiliary organic ridge pattern 337.

Figure 20:
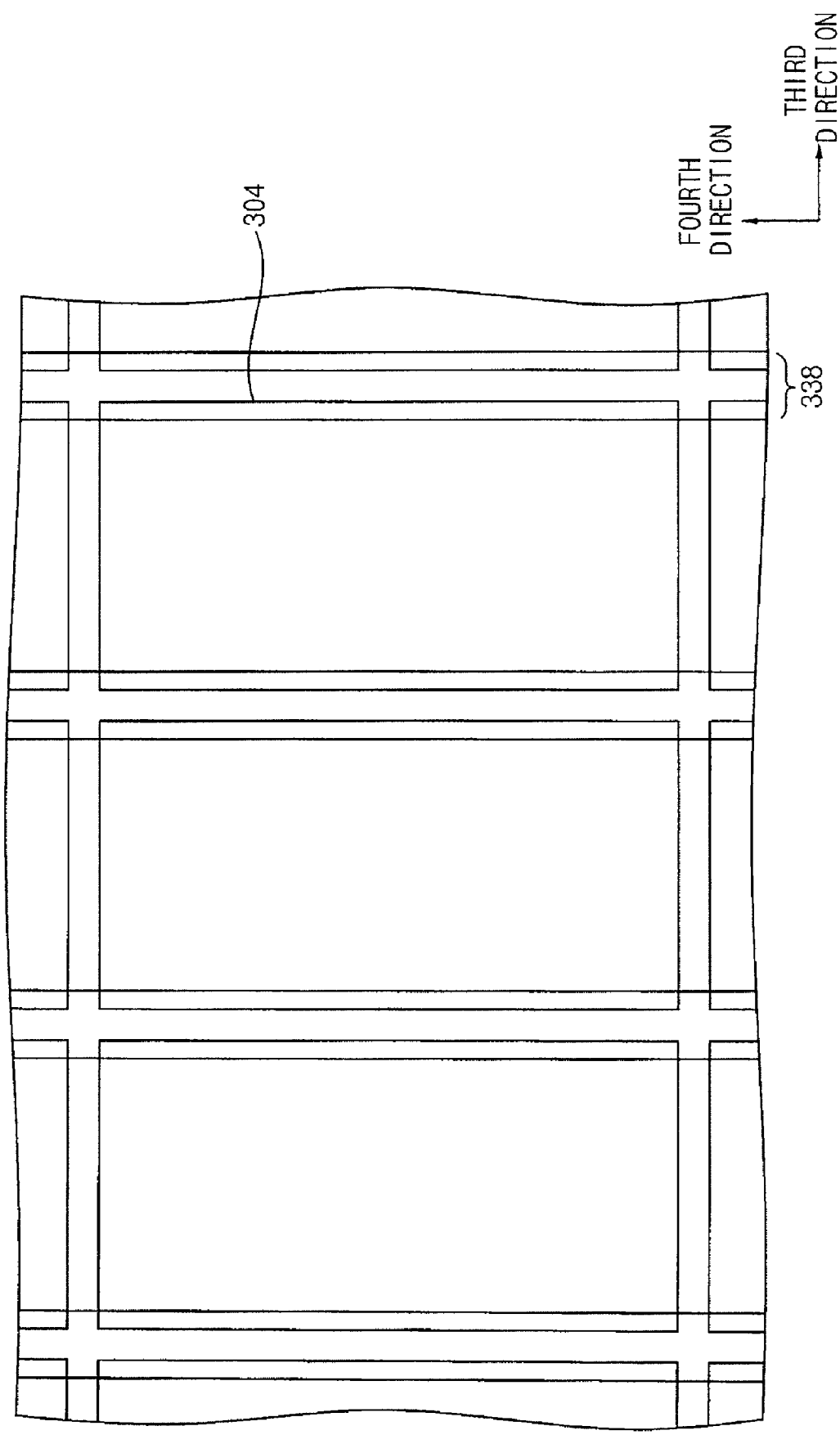
FIG. 20 is a plan view illustrating an opposite substrate in accordance with an exemplary embodiment of the present invention.

FIG. 20 is a plan view illustrating an opposite substrate in accordance with an exemplary embodiment of the present invention. The opposite substrate of FIG. 20 is substantially the same as in FIGS. 14 and 15 except for an opposite organic ridge pattern. Thus, the same reference numerals will be used to refer to the same or like parts as those described in FIGS. 14 and 15 and any further explanation concerning the above elements will be omitted.

Referring to FIG. 20, the opposite organic ridge pattern 338 is extended only in the fourth direction. In FIG. 20, the opposite organic ridge pattern 338 is not extended in the third direction that is substantially perpendicular to the fourth direction.

A common electrode 306 (shown in FIG. 15) is protruded in the fourth direction along the opposite organic ridge pattern 338 that is extended in the fourth direction.

According to the opposite substrate of FIG. 20, the opposite organic ridge pattern 338 that is protruded in the fourth direction substantially prevents leakage of light in the fourth direction.

Figure 21:
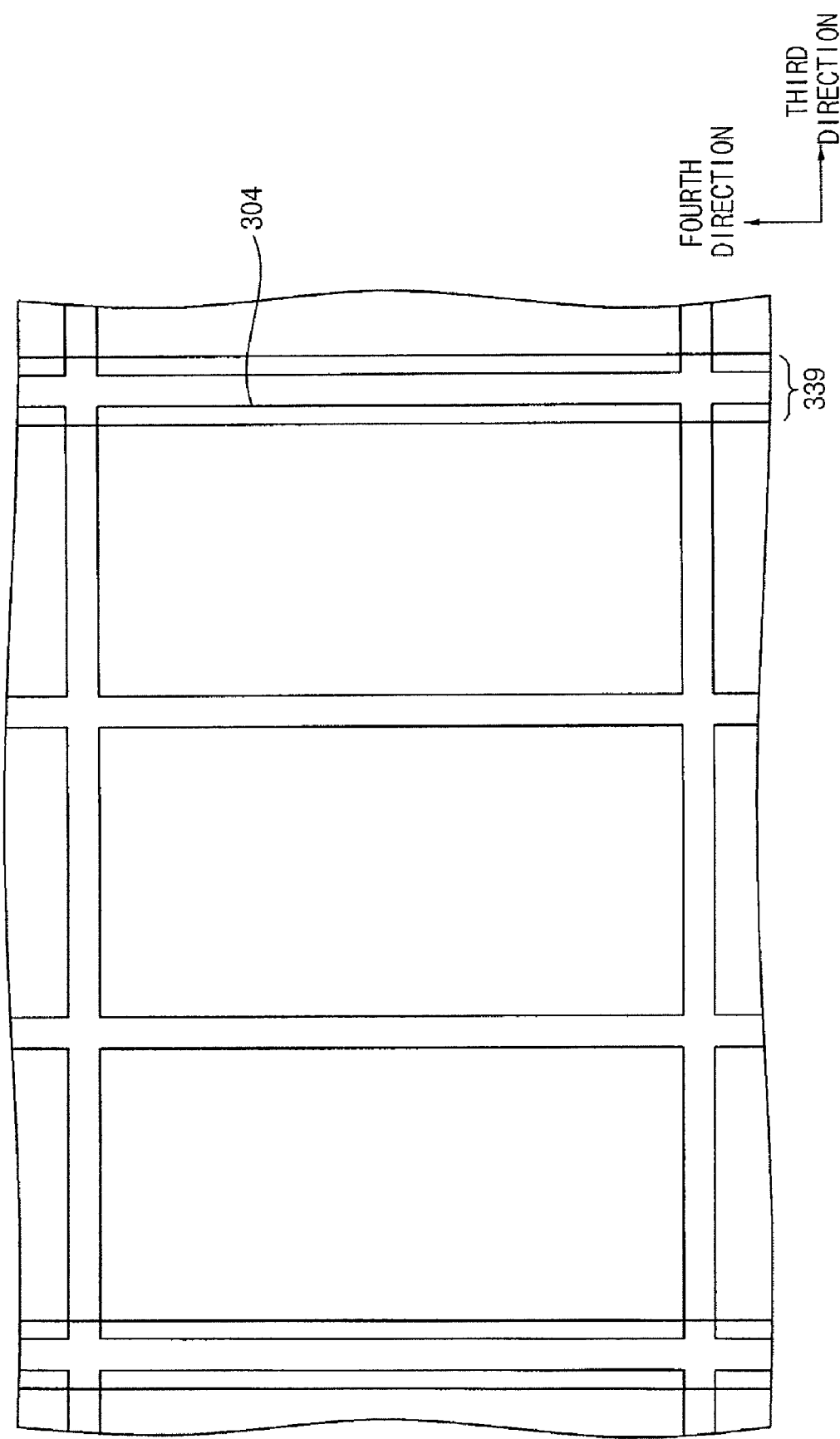
FIG. 21 is a plan view illustrating an opposite substrate in accordance with an exemplary embodiment of the present invention.

FIG. 21 is a plan view illustrating an opposite substrate in accordance with an exemplary embodiment of the present invention. The opposite substrate of FIG. 21 is substantially the same as in FIGS. 14 and 15 except for an opposite organic ridge pattern. Thus, the same reference numerals will be used to refer to the same or like parts as those described in FIGS. 14 and 15 and any further explanation concerning the above elements will be omitted.

Referring to FIG. 21, the opposite organic ridge pattern 339 is disposed on a side of every three color filters 304 (shown in FIG. 15) in the third direction.

When an array substrate facing the opposite substrate includes a photo sensing electrode or a pressure sensing electrode, the opposite organic ridge pattern 339 corresponds to the photo sensing electrode or the pressure sensing electrode.

Figure 22:
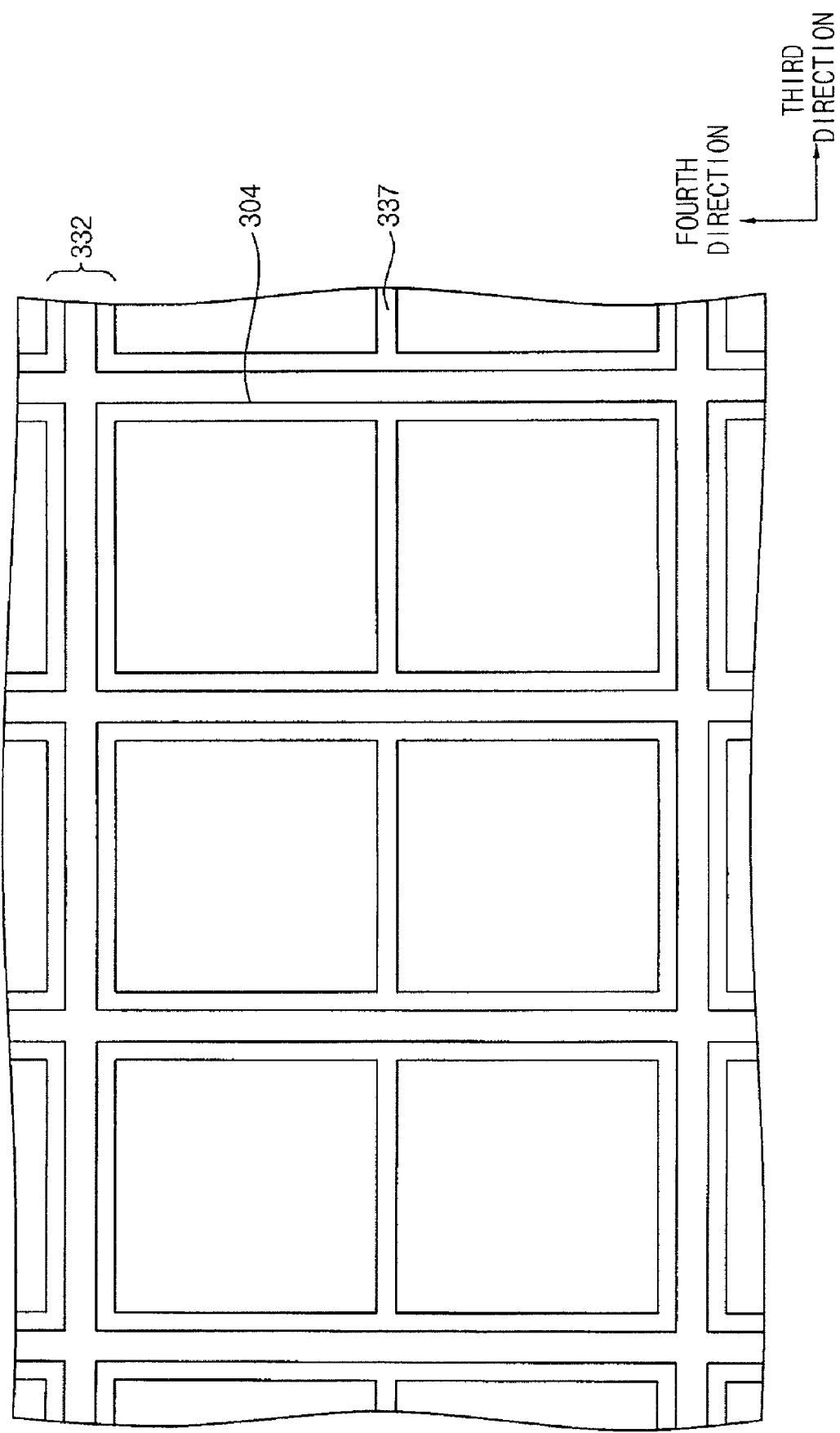
FIG. 22 is a plan view illustrating an opposite substrate in accordance with an exemplary embodiment of the present invention.

FIG. 22 is a plan view illustrating an opposite substrate in accordance with an exemplary embodiment of the present invention. The opposite substrate of FIG. 22 is substantially the same as in FIGS. 14 and 15 except for an opposite organic ridge pattern. Thus, the same reference numerals will be used to refer to the same or like parts as those described in FIGS. 14 and 15 and any further explanation concerning the above elements will be omitted.

Referring to FIG. 22, the opposite substrate may further include an auxiliary organic ridge pattern 337. The auxiliary organic ridge pattern 337 is formed from substantially the same layer as the opposite organic ridge pattern 332, and crosses a plurality of color filters 304 in the third direction.

The opposite organic ridge pattern 332 and the auxiliary organic ridge pattern 337 divide the color filters 304 into a net shape.

According to the opposite substrate of FIG. 22, liquid crystals are surrounded by the opposite organic ridge pattern 332 and the auxiliary organic ridge pattern 337 to be aligned along side surfaces of the opposite organic ridge pattern 332 and the auxiliary organic ridge pattern 337. Therefore, viewing angle of a display substrate having the opposite substrate and response speed of the liquid crystals are improved.

Figure 23:
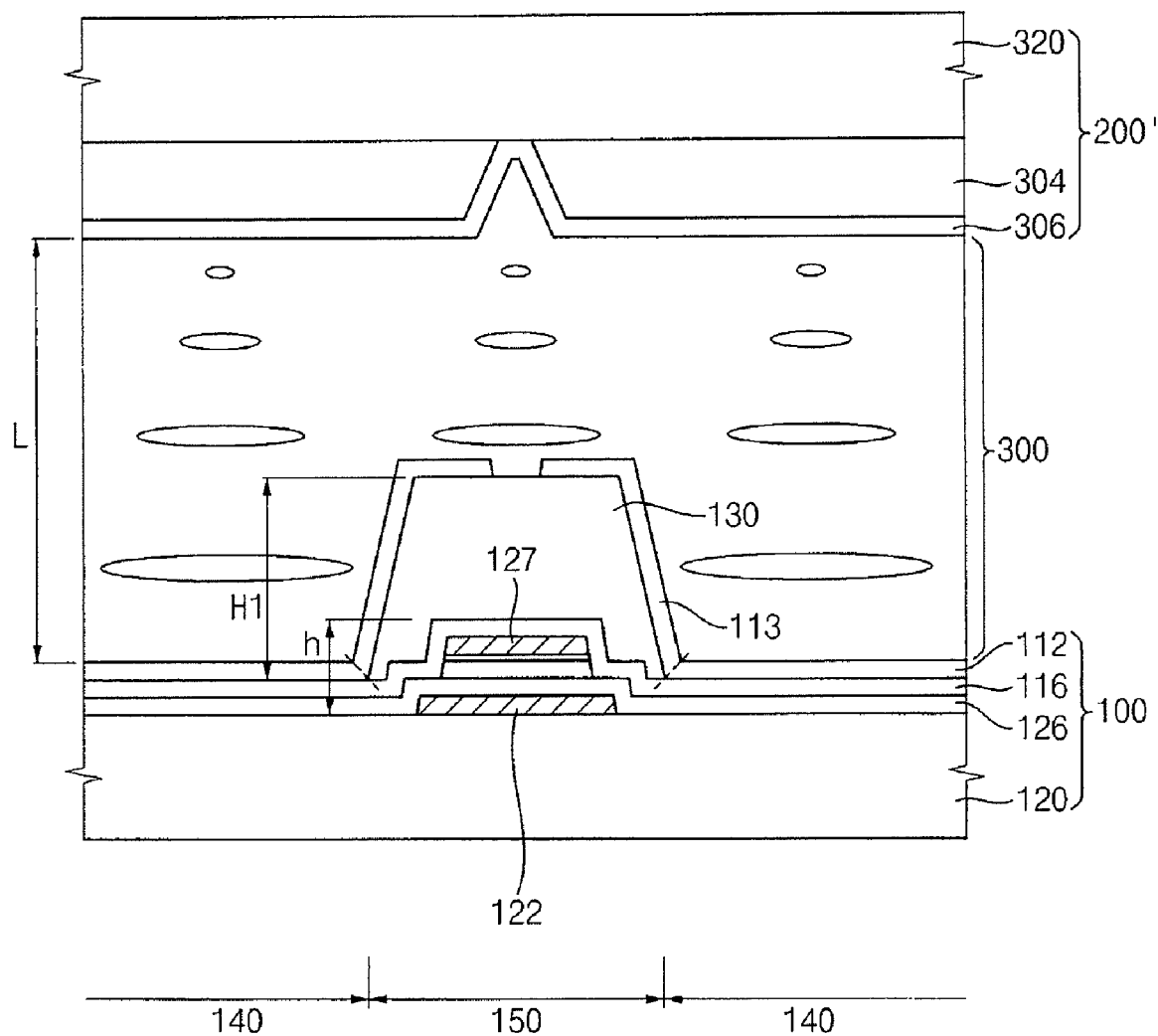
FIG. 23 is a cross-sectional view illustrating a display device in accordance with an exemplary embodiment of the present invention.

FIG. 23 is a cross-sectional view illustrating a display device in accordance with an exemplary embodiment of the present invention.

Referring to FIG. 23, the display device includes an array substrate 100, an opposite substrate 200' and a liquid crystal layer 300.

The array substrate 100 of FIG. 23 is substantially the same as in FIGS. 1 to 4. Thus, the same reference numerals will be used to refer to the same or like parts as those described in FIGS. 1 to 4 and any further explanation concerning the above elements will be omitted.

In addition, the opposite substrate 200' of FIG. 23 is substantially the same as in FIGS. 14 and 15. Thus, the same reference numerals will be used to refer to the same or like parts as those described in FIGS. 14 and 15 and any further explanation concerning the above elements will be omitted.

The opposite substrate 200' includes an upper base substrate 320, a color filter 304 and a common electrode 306. The color filter 304 is disposed on the upper base substrate 320. The common electrode 306 is disposed on the upper base substrate 320 to cover the color filter 304.

A liquid crystal layer 300 is interposed between the array substrate 100 and the opposite substrate 200'. The liquid crystal layer 300 may have a twisted nematic (TN) mode, a super twisted nematic (STN) mode, a horizontal alignment mode, an electrically controlled birefringence (ECB) mode, a vertically aligned mode, etc.

In FIG. 23, a thickness H1 of the organic ridge pattern 130 is greater than a height h of a passivation layer 116 with respect to an upper surface of a lower base substrate 120, and is smaller than about a half of a thickness L of the liquid crystal layer 300. When the thickness H1 of the organic ridge pattern 130 is smaller than the height h of the passivation layer 116, a parasitic capacitance between a shielding electrode 113 and a data line 127 may be increased to deteriorate an image display quality. Also, when the thickness H1 of the organic ridge pattern 130 is greater than about the half of the thickness L of the liquid crystal layer 300, movement of liquid crystals on the organic ridge pattern 130 may be restricted to deteriorate the image display quality.

According to the display device of FIG. 23, leakage of light on the organic ridge pattern 130 is decreased, and response speed of the liquid crystals is increased. In addition, a viewing angle is increased by a side surface of the organic ridge pattern 130.

Figure 24:
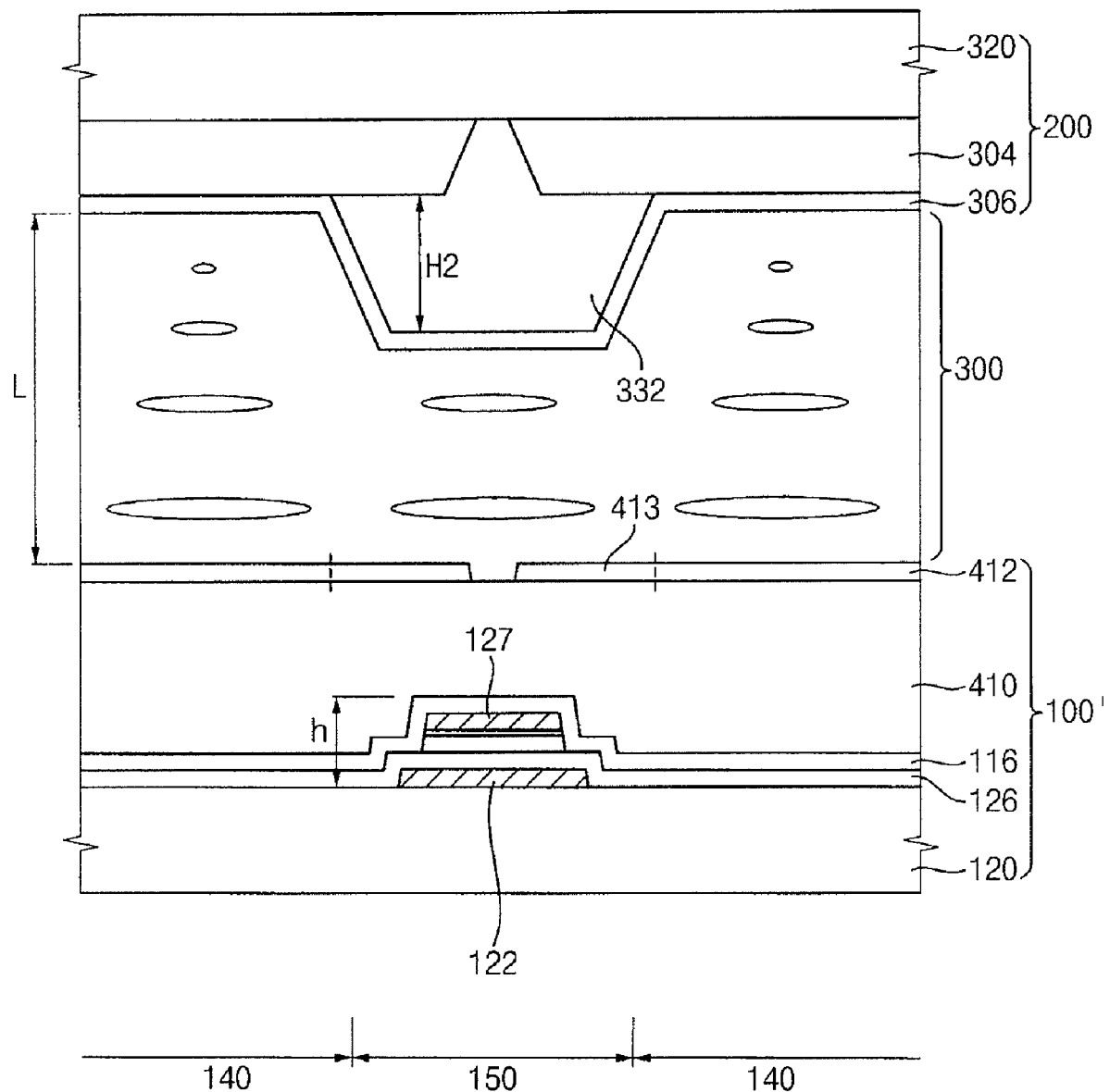
FIG. 24 is a cross-sectional view illustrating a display device in accordance with an exemplary embodiment of the present invention.

FIG. 24 is a cross-sectional view illustrating a display device in accordance with an exemplary embodiment of the present invention.

Referring to FIG. 24, the display device includes an array substrate 100', an opposite substrate 200 and a liquid crystal layer 300.

The array substrate 100' of FIG. 24 is substantially same as in FIGS. 1 to 4 except for a planarizing layer. Thus, the same reference numerals will be used to refer to the same or like parts as those described in FIGS. 1 to 4 and any further explanation concerning the above elements will be omitted.

The array substrate 100' includes a lower base substrate 120, a gate line 128, a light blocking pattern 122, a gate insulating layer 126, a thin film transistor 119, a data line 127, a passivation layer 116, the planarizing layer 410, a pixel electrode 412 and a shielding electrode 413.

The planarizing layer 410 is disposed on the passivation layer 116 to planarize a surface of the lower base substrate 120 on which the gate line 128, the light blocking pattern 122, the gate insulating layer 126, the thin film transistor 119, the data line 127 and the passivation layer 116 is formed. In addition, the planarizing layer 410 increases a distance between the shielding electrode 413 and the data line 127 to decrease a parasitic capacitance between the shielding electrode 413 and the data line 127.

The opposite substrate 200 of FIG. 24 is substantially the same as in FIGS. 14 and 15. Thus, the same reference numerals will be used to refer to the same or like parts as those described in FIGS. 14 and 15 and any further explanation concerning the above elements will be omitted.

The liquid crystal layer 300 is interposed between the array substrate 100' and the opposite substrate 200.

In FIG. 24, a thickness H2 of an opposite organic ridge pattern 332 is smaller than about a half of a thickness L of the liquid crystal layer 300. When the thickness H2 of the opposite organic ridge pattern 332 is greater than about the half of the thickness L of the liquid crystal layer 300, the opposite organic ridge pattern 332 may restrict a movement of liquid crystals on the opposite organic ridge pattern 332, thereby deteriorating an image display quality of the display device. For example, the thickness H2 of the opposite organic ridge pattern 332 may be greater than a height h of the passivation layer 116 covering the data line 127 with respect to an upper surface of the lower base substrate 120.

Figure 25:
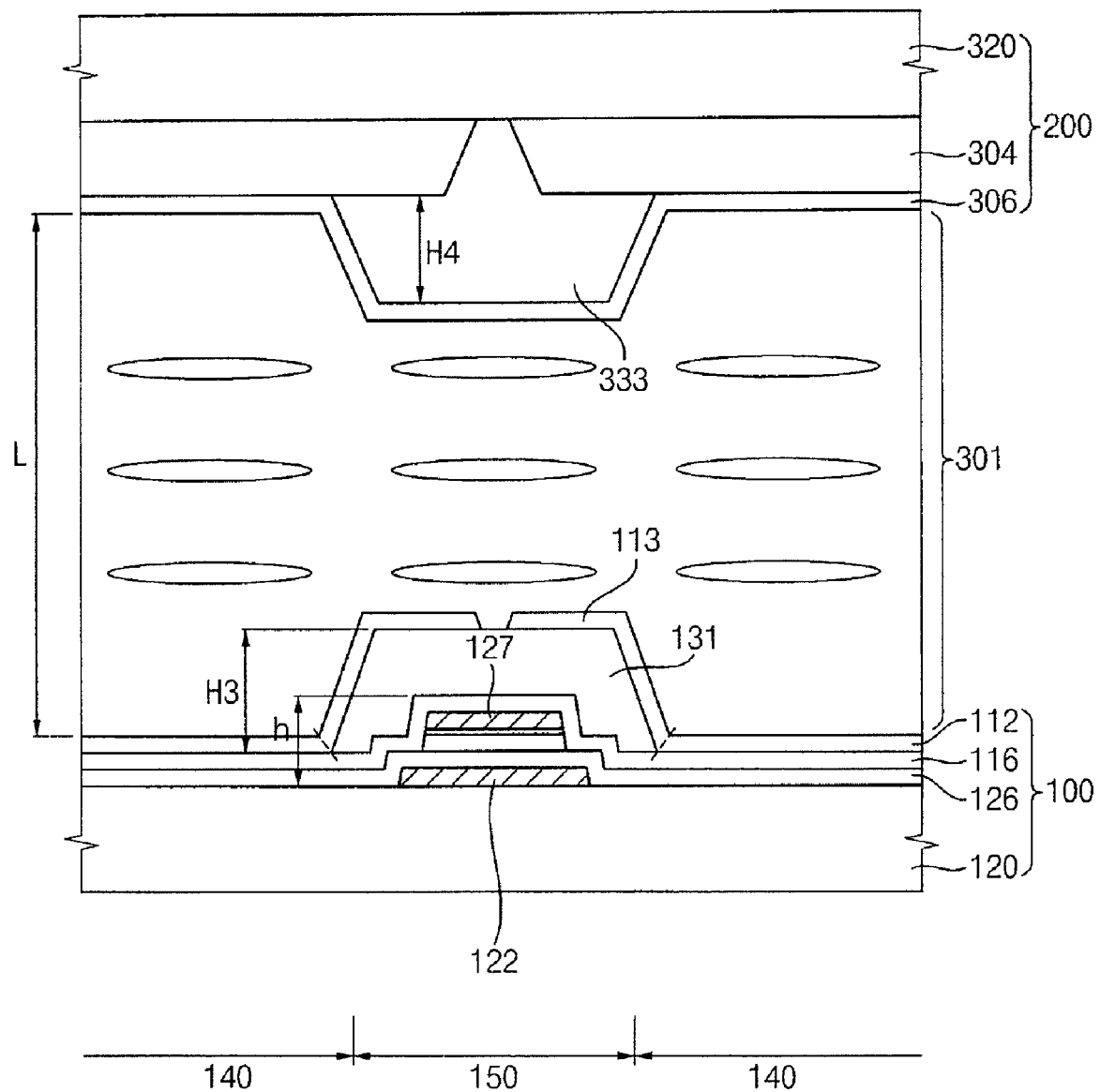
FIG. 25 is a cross-sectional view illustrating a display device in accordance with an exemplary embodiment of the present invention.

FIG. 25 is a cross-sectional view illustrating a display device in accordance with an exemplary embodiment of the present invention.

Referring to FIG. 25, the display device includes an array substrate 100, an opposite substrate 200 and a liquid crystal layer 300.

The array substrate 100 of FIG. 25 is substantially the same as in FIGS. 1 to 4 except for a height of an organic ridge pattern. Thus, the same reference numerals will be used to refer to the same or like parts as those described in FIGS. 1 to 4 and any further explanation concerning the above elements will be omitted.

In addition, the opposite substrate 200 of FIG. 25 is substantially the same as in FIGS. 14 and 15 except for a height of an opposite organic ridge pattern. Thus, the same reference numerals will be used to refer to the same or like parts as those described in FIGS. 14 and 15 and any further explanation concerning the above elements will be omitted.

The liquid crystal layer 300 is interposed between the array substrate 100 and the opposite substrate 200.

In FIG. 25, a summation of a height H3 of the organic ridge pattern 131 and a height H4 of the opposite organic ridge pattern 332 is smaller than about a half of a thickness L of the liquid crystal layer 300. When the summation of the height H3 of the organic ridge pattern 131 and the height H4 of the opposite organic ridge pattern 332 is greater than about half of the thickness L of the liquid crystal layer 300, movement of liquid crystals interposed between the organic ridge pattern 131 and the opposite organic ridge pattern 333 may be restricted to deteriorate an image display quality of the display device. In addition, the thickness H3 of the organic ridge pattern 131 is greater than a height h of the passivation layer 116 with respect to an upper surface of the lower base substrate 120. When the thickness of the organic ridge pattern 131 is smaller than the height of the passivation layer 116, a parasitic capacitance between a shielding electrode and the data line 127 may be increased, thereby deteriorating the image display quality.

Figure 26:
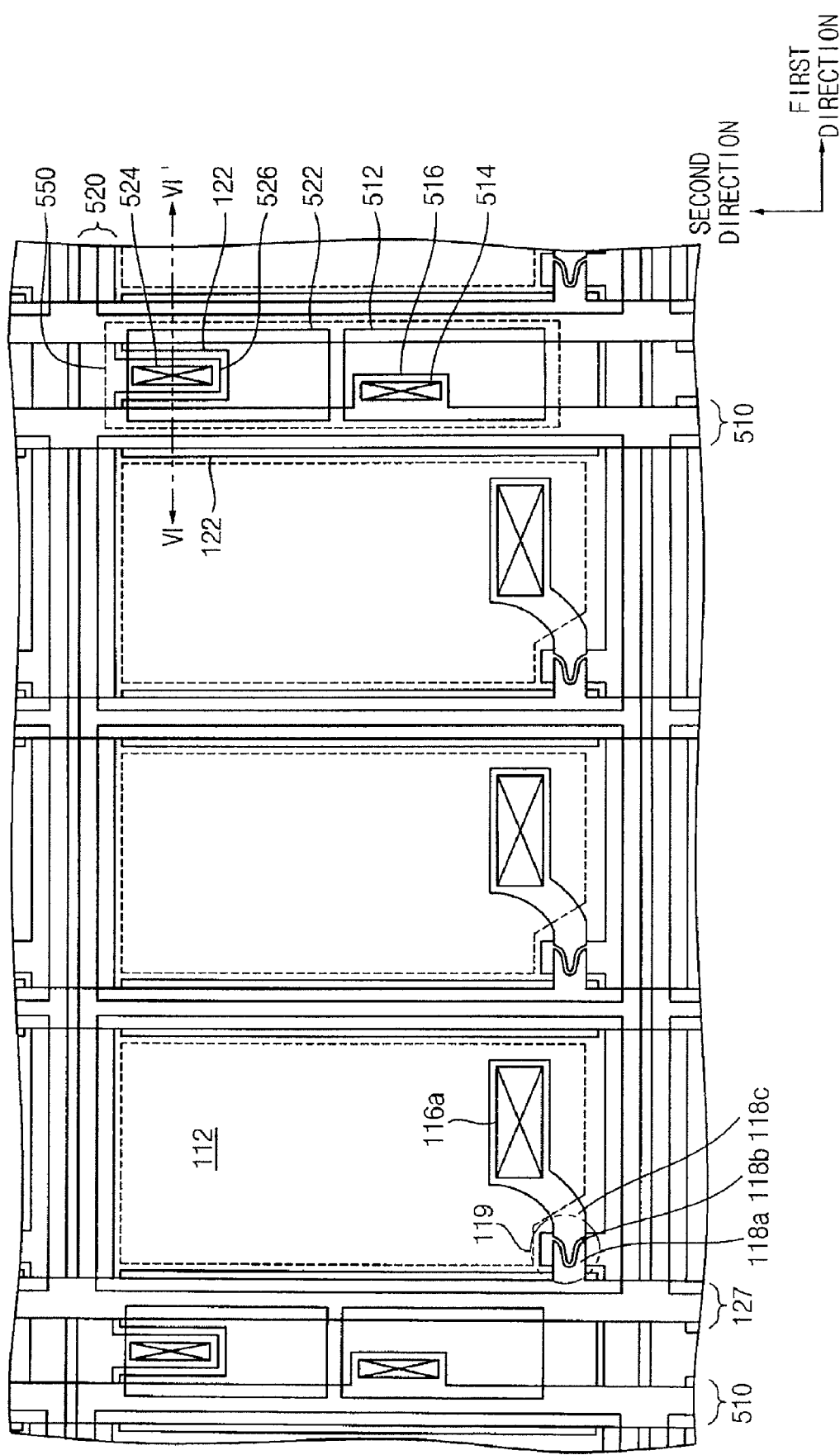
FIG. 26 is a plan view illustrating a display device in accordance with an exemplary embodiment of the present invention.
Figure 27:
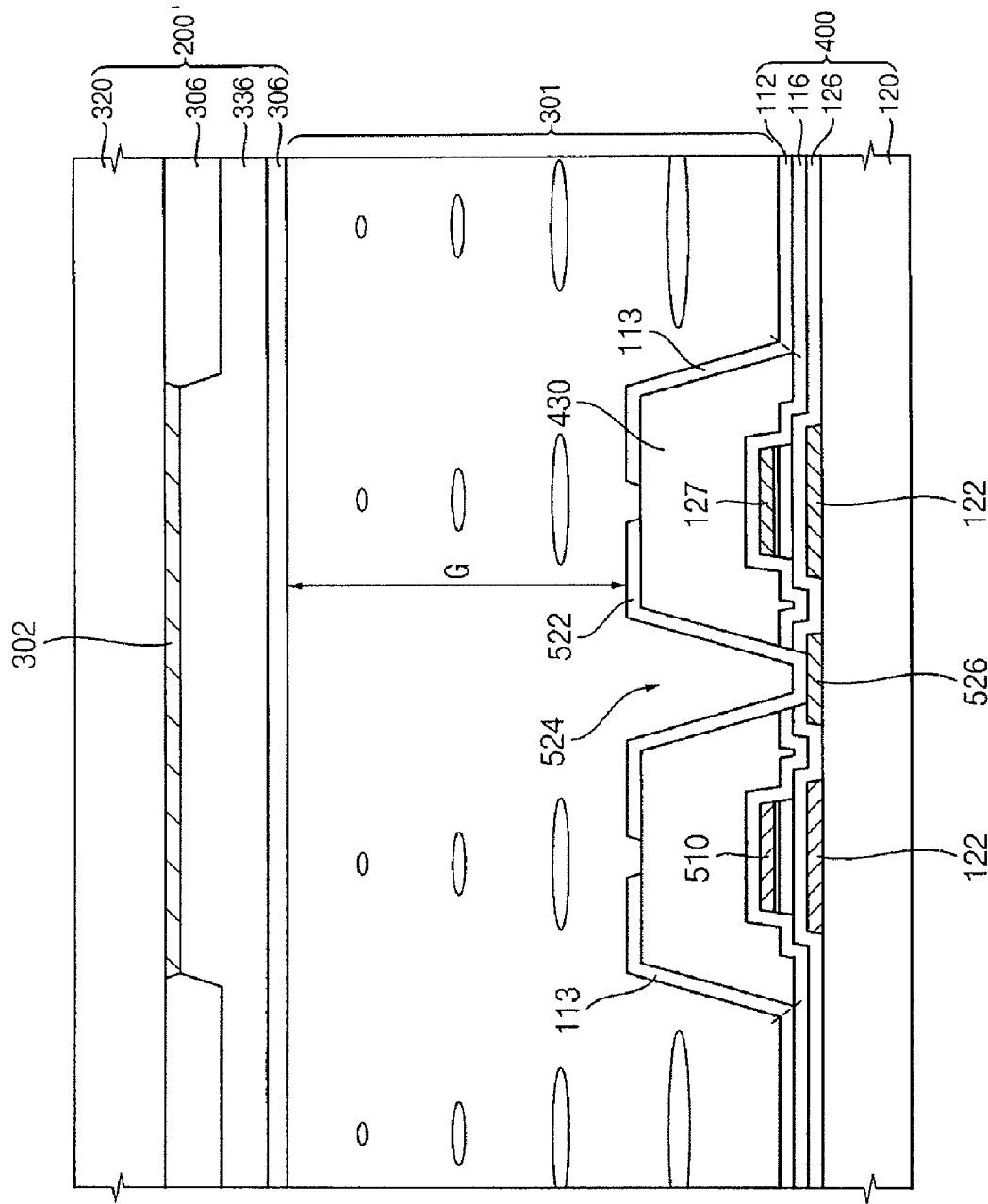
FIG. 27 is a cross-sectional view taken along a line VI-VI' shown in FIG. 26.

FIG. 26 is a plan view illustrating a display device in accordance with an exemplary embodiment of the present invention. FIG. 27 is a cross-sectional view taken along a line VI-VI' shown in FIG. 26. The display device of FIGS. 26 and 27 is substantially the same as in FIG. 23 except for an array substrate. Thus, the same reference numerals will be used to refer to the same or like parts as those described in FIG. 23 and any further explanation concerning the above elements will be omitted.

Referring to FIGS. 26 and 27, the display device includes an array substrate 400, an opposite substrate 200' and a liquid crystal layer 301.

The array substrate 400 includes a lower base substrate 120, a gate line 128, a data line 127, a thin film transistor 119, a first sensing line 510, a second sensing line 520, a sensing part 550, a gate insulating layer 126, a passivation layer 116, an organic ridge pattern 430, a pixel electrode 112 and a shielding electrode 113.

The sensing part 550 is interposed between adjacent shielding electrodes 113, and includes a first sensing electrode 512, a second sensing electrode 522, a first connecting electrode 516, a second connecting electrode 526, a first contact hole 514 and a second contact hole 524. In FIGS. 26 and 27, each of the first and second sensing electrodes 512 and 522 is a pressure sensing electrode.

The first sensing electrode 512 is disposed on the organic ridge pattern 430, and is electrically connected to the first connecting electrode 516 through the first contact hole 514. The first sensing electrode 512 is formed from substantially the same layer as the pixel electrode 112 and the shielding electrode 113.

The first contact hole 514 is formed through the organic ridge pattern 430 and the passivation layer 116, and the first connecting electrode 516 is partially exposed through the first contact hole 514.

The first connecting electrode 516 is electrically connected to the first sensing line 510, and is interposed between the gate insulating layer 126 and the passivation layer 116. In FIGS.

26 and 27, the first connecting electrode 516 is formed from substantially the same layer as the first sensing line 510.

The second sensing electrode 522 is disposed on the organic ridge pattern 430, and is electrically connected to the second connecting electrode 526 through the second contact hole 524. The second sensing electrode 522 is formed from substantially the same layer as the pixel electrode 112 and the shielding electrode 113.

The second contact hole 524 is formed through the organic ridge pattern 430, the passivation layer 116 and the gate insulating layer 126, and the second connecting electrode 516 is partially exposed through the second contact hole 524.

The second connecting electrode 526 is electrically connected to the second sensing line 520, and is interposed between the lower base substrate 120 and the gate insulating layer 126. In FIGS. 26 and 27, the second connecting electrode 526 is formed from substantially the same layer as the second sensing line 520.

When an externally provided pressure is applied to the opposite substrate 200', a distance G between the common electrode and each of the first and second sensing electrodes 512 and 522 is decreased. Therefore, a capacitance between the common electrode 306 and each of the first and second sensing electrodes 512 and 522 is increased so that a first pressure sensing signal or a second pressure sensing signal is generated. The first pressure sensing signal corresponds to a location of the pressurized point in a first direction. The second pressure sensing signal corresponds to a location of the pressurized point in the second direction.

The first sensing line 510 is disposed on the gate insulating layer 126, and is formed from substantially the same layer as the data line 127. In FIGS. 26 and 27, the first sensing line 510 is extended in the second direction, and transmits the first pressure sensing signal.

The second sensing line 520 is interposed between the lower base substrate 120 and the gate insulating layer 126, and is formed from substantially the same layer as the gate line 128 and a light blocking pattern 122. In FIGS. 26 and 27, the second sensing line 520 is extended in the first direction, and transmits the second pressure sensing signal.

The sensing part 550 is adjacent to every three date lines 127 in the first direction.

The organic ridge pattern 430 is extended in the first and second directions.

In FIGS. 26 and 27, the sensing part 550 senses the pressure to determine the location of the pressurized point, thereby detecting a position of an object on the opposite substrate 200'. Alternatively, the sensing part may sense light to detect the position of the object.

According to the display device of FIGS. 26 and 27, the sensing part 550 is integrated onto the lower base substrate 120 to detect the position of the object on the opposite substrate 200'.

In addition, the distance G between the shielding electrode 113 and the common electrode 306 is decreased by the organic ridge pattern 430 to increase an intensity of an electric field applied between the shielding electrode 113 and the common electrode 306. Thus, although the pressure is applied to the liquid crystal layer 301, a restoring force of liquid crystals of the liquid crystal layer 301 is increased. According to a display substrate, a method of manufacturing the display substrate and a display device having the display substrate of the present invention, distortion of liquid crystals interposed between adjacent pixel electrodes is substantially prevented, and a response speed and a restoring force of the liquid crystals are increased. Also, viewing angle and aperture ratio of the display device are improved.

Also, the liquid crystals adjacent to the side surface of the organic ridge pattern are aligned toward the pixel region so that the restoring force of the liquid crystals and a viewing angle of the display device are improved.

In addition, the side surface of the organic ridge pattern may be exposed to the liquid crystals so that uniformity of liquid crystal arrangement may be increased on the organic ridge pattern, thereby decreasing light leakage.

Furthermore, the auxiliary organic ridge pattern may be formed on the color filters to increase the response speed of the liquid crystals on the color filters.

Also, the sensing part may be integrated onto the lower base substrate so that location of an element of the opposite substrate may be changed.

This invention has been described with reference to exemplary embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A display device comprising:
   an array substrate comprising:
      a base substrate having a plurality of pixel regions and a signal transmission region interposed between the pixel regions;
      a signal transmission line disposed in the signal transmission region, the signal transmission line including at least one of a gate line and a data line;
      a passivation layer covering the signal transmission line in the signal transmission region;
      a pixel electrode formed in each of the pixel regions and on the passivation layer;
      an organic layer having an opening exposing the passivation layer such that the pixel electrode is disposed in the opening, an organic ridge pattern protruding directly on the passivation layer in the signal transmission region and separated from the base substrate; and
      a shielding electrode disposed on an upper surface of the organic ridge pattern in the signal transmission region such that a gap between adjacent shielding electrodes is overlapped with the signal transmission line;
   an opposite substrate facing the array substrate, the opposite substrate including an opposite base substrate and a common electrode on the opposite base substrate; and
   a liquid crystal layer interposed between the array substrate and the opposite substrate.

2. The display device of claim 1, wherein the shielding electrode surrounds the pixel electrode.

3. The display device of claim 2, wherein the shielding electrode comprises:
   a shielding portion spaced apart from the pixel electrode to form a second opening; and
   a connecting portion electrically connecting the pixel electrode to the shielding portion.

4. The display device of claim 1, wherein the signal transmission line is disposed under the organic ridge pattern and overlaps with the shielding electrode.

5. The display device of claim 1, further comprising a sensing part interposed between the adjacent pixel regions to generate a sensing signal based on an externally provided pressure.

6. The display device of claim 5, wherein the sensing part comprises:
   a sensing line on the base substrate; and a sensing electrode on the organic ridge pattern, the sensing electrode electrically connected to the sensing line.

7. The display device of claim 1, further comprising a thin film transistor electrically connected to the pixel electrode on the base substrate,
wherein the thin film transistor is covered by the organic ridge pattern.

8. The display device of claim 1, wherein a height of the organic ridge pattern is less than a half of a thickness of the liquid crystal layer.

9. The display device of claim 1, wherein the opposite substrate further comprises an opposite organic ridge pattern on the opposite base substrate corresponding to a region between adjacent pixel regions, and the common electrode covers the opposite organic ridge pattern.

10. The display device of claim 9, wherein a summation of a height of the organic ridge pattern and a height of the opposite organic ridge pattern is smaller than a half of a thickness of the liquid crystal layer.

11. A display device comprising:
an array substrate comprising:
a base substrate having a plurality of pixel regions and a signal transmission region interposed between the pixel regions;
a signal transmission line disposed in the signal transmission region, the signal transmission line including at least one of a gate line and a data line;
a passivation layer covering the signal transmission line in the signal transmission region;
an organic layer having an opening exposing the passivation layer and a first organic ridge pattern protruding directly on the passivation layer in the signal transmission region;
a pixel electrode formed in each of the pixel regions and formed in the opening; and
a shielding electrode disposed on an upper surface of the organic ridge pattern in the signal transmission region such that a gap between adjacent shielding electrodes is overlapped with the signal transmission line;
an opposite substrate facing the array substrate, the opposite substrate including:
an opposite base substrate;
a plurality of color filters on the opposite base substrate;
an organic insulation layer having a second organic ridge pattern protruding in the signal transmission region; and
a common electrode on the opposite base substrate to cover the color filters and the second organic ridge pattern; and
a liquid crystal layer interposed between the array substrate and the opposite substrate.

12. The display device of claim 11, further comprising an auxiliary organic ridge pattern protruded on the color filters, the auxiliary organic ridge pattern being extended in a direction crossing the color filters.

13. The display device of claim 11, wherein the second organic ridge pattern is extended in a first direction on the opposite base substrate.

14. The display device of claim 13, further comprising a third organic ridge pattern surrounding a plurality of color filters aligned in a second direction substantially perpendicular to the first direction on the opposite base substrate.

15. A method of manufacturing a display substrate comprising:
forming a signal transmission line in a signal transmission region interposed between pixel regions on a base substrate, the signal transmission line including at least one of a gate line and a data line;
forming a passivation layer to cover the signal transmission line in the signal transmission region;
forming an organic insulation layer on the passivation layer;
removing a portion of the organic insulation layer in the pixel regions to form an organic ridge pattern protruding on the passivation layer in the signal transmission region;
forming a transparent conductive layer on the base substrate; and
patterning the transparent conductive layer to form a pixel electrode in each of the pixel regions and to form a shielding electrode on an upper surface of the organic ridge pattern in the signal transmission region such that a gap between adjacent shielding electrodes is overlapped with the signal transmission line.

16. The method of claim 15, wherein patterning the transparent conductive layer includes removing a portion of the transparent conductive layer between the pixel electrode and the shielding electrode.

* * * * *